US012789695B2

(12) United States Patent
Johnson et al.

(10) Patent No.: US 12,789,695 B2
(45) Date of Patent: Nov. 10, 2026

(54) LIFTS FOR RECREATIONAL VEHICLES AND OTHER STRUCTURES

(71) Applicant: Lippert Components, Inc., Elkhart, IN (US)

(72) Inventors: Chad Johnson, Fielding, UT (US); Richard Briggs, Roy, UT (US); Aaron Rasmussen, Fruit Heights, UT (US)

( * ) Notice: Subject to any disclaimer, the term of this patent is extended or adjusted under 35 U.S.C. 154(b) by 334 days.

(21) Appl. No.: 18/582,605

(22) Filed: Feb. 20, 2024

(65) Prior Publication Data

US 2024/0278708 A1 Aug. 22, 2024

Related U.S. Application Data

(60) Provisional application No. 63/485,984, filed on Feb. 20, 2023.

(51) Int. Cl.
*B60P 3/39* (2006.01)
*B60N 3/00* (2006.01)
(Continued)

(52) U.S. Cl.
CPC ................ *B60P 3/39* (2013.01); *B60N 3/001* (2013.01); *B60N 3/008* (2013.01); *B60N 3/16* (2013.01); *B60P 3/34* (2013.01)

(58) Field of Classification Search
CPC . A47C 17/80; A47C 17/84; B60P 3/32; B60P 3/34; B60P 3/38; B60P 3/39; B60N 3/001; B60N 3/16
(Continued)

(56) References Cited

U.S. PATENT DOCUMENTS 2,216,243 A 10/1940 Kreidler
3,028,606 A 4/1962 Boutet
(Continued)

FOREIGN PATENT DOCUMENTS

CN 216627896 U 5/2022
DE 102013101362 10/2013
(Continued)

OTHER PUBLICATIONS

#35 Bed Frame Conversion Brackets, Amazon.com, available at https://www.amazon.com/Innovative-Gear-Conversion-Headboard-Adjustment/dp/B01MA56EP2, Oct. 17, 2016 (7 pp.).
(Continued)

*Primary Examiner* — Jason S Daniels
(74) *Attorney, Agent, or Firm* — FisherBroyles, LLP

(57) ABSTRACT

Various embodiments of a lift are described. In some embodiments, the lift is part of a vehicle and includes a guide rail, a carriage coupled to the guide rail, and a mounting bracket coupled to the carriage where the mounting bracket can move vertically relative to the carriage. In some embodiments, the lift can include an electric motor positioned at the top of the guide rail and the mounting bracket can be offset to the side to allow a vehicle accessory that is coupled to the mounting bracket to clear the electric motor when it is raised. In some embodiments, the lift can include a flexible support line extending upward from a lower anchor point to one side of the bed, across the bed to the opposite side of the bed, and upward from the opposite side of the bed to an upper anchor point.

6 Claims, 33 Drawing Sheets

(51) Int. Cl.
*B60N 3/16* (2006.01)
*B60P 3/34* (2006.01)

(58) Field of Classification Search
USPC .......................................................... 296/156
See application file for complete search history.

(56) References Cited

U.S. PATENT DOCUMENTS

| | | | | |
|---|---|---|---|---|
| 3,494,656 | A | 2/1970 | McIntire | |
| 6,676,233 | B1 | 1/2004 | Evans et al. | |
| 7,198,320 | B2 | 4/2007 | Rasmussen | |
| 7,347,484 | B2 * | 3/2008 | Nebel | A47C 17/80 296/156 |
| 7,559,097 | B2 | 7/2009 | Brun | |
| 7,789,446 | B2 | 9/2010 | Hirsch et al. | |
| 10,463,161 | B2 | 11/2019 | Johnson et al. | |
| 10,806,269 | B2 | 10/2020 | Baden et al. | |
| 11,312,289 | B2 | 4/2022 | Johnson et al. | |
| 12,337,744 | B1 * | 6/2025 | Johnson | B60N 2/34 |
| 2006/0066131 | A1 | 3/2006 | Nebel | |
| 2008/0116012 | A1 | 5/2008 | Ferguson | |
| 2009/0110528 | A1 | 4/2009 | Walter et al. | |
| 2012/0025555 | A1 * | 2/2012 | Rasmussen | B60P 1/02 248/295.11 |
| 2013/0081336 | A1 | 4/2013 | Rasmussen | |
| 2015/0239387 | A1 * | 8/2015 | Marasco | B60P 3/39 296/156 |
| 2015/0329035 | A1 | 11/2015 | Johnson et al. | |
| 2017/0210273 | A1 * | 7/2017 | Rasmussen | A47C 19/025 |
| 2018/0027978 | A1 | 2/2018 | Johnson et al. | |
| 2019/0217752 | A1 | 7/2019 | Johnson | |
| 2021/0362641 | A1 | 11/2021 | Rasmussen | |
| 2022/0242300 | A1 * | 8/2022 | Johnson | B60P 3/39 |

FOREIGN PATENT DOCUMENTS

| | | |
|---|---|---|
| EP | 0418415 | 3/1991 |
| EP | 2649907 | 10/2013 |
| FR | 2668348 | 4/1992 |
| GB | 2276315 | 9/1994 |

OTHER PUBLICATIONS

Bolster Swivel Bracket Assembly, West Marine, available at https://www.westmarine.com/c-e-smith-13inch-bolster-swivel-bracket-384638.html, Feb. 2018 (5 pp.).
CE Smith Bolster and Swivel Bracket Assemblies, etrailer.com, available at https://www.etrailer.com/Boat-Trailer-Parts/CE-Smith/CE10000G-4.html, earliest product review dated Apr. 21, 2014 (13 pp.).
Diago 504 Installation Instructions, Granberg Interior AB, Jan. 10, 2024, the concepts described may have been known in other documents before the earliest effective filing date (see "Date Information" section below for more information) (26 pp.).
Diago 504 Operating/Care Instructions, Granberg Interior AB, Feb. 21, 2024, the concepts described may have been known in other documents before the earliest effective filing date (see "Date Information" section below for more information) (2 pp.).
Diago 504 User Manual, Granberg Interior AB, Feb. 21, 2024, the concepts described may have been known in other documents before the earliest effective filing date (see "Date Information" section below for more information) (8 pp.).
Hatch Lift Stainless Steel Slide Bracket, West Marine, available at https://www.westmarine.com/lenco-marine-hatch-lift-stainless-steel-slide-bracket-11035722.html by at least Dec. 16, 2022, earliest publication date unknown (see "Date Information" section below for more information) (3 pp.).

* cited by examiner

LIFTS FOR RECREATIONAL VEHICLES AND OTHER STRUCTURES

TECHNICAL FIELD

This relates to lifts used to raise accessories such as beds in structures such as vehicles. In particular, this relates to vehicles such as recreational vehicles that include a lift configured to lift vehicle accessories such as beds, cooktops, countertops, and the like.

BACKGROUND

Recreational vehicles (RVs) provide the comfort and convenience of home amenities while allowing for the mobility and freedom to explore various locations. One of the challenges in designing and using RVs is the efficient use of space, given their confined interior dimensions. To address this issue, bed lifts have been introduced as a solution for optimizing the usage of available space. These devices allow beds within the RV to be raised or lowered, thus enabling the space beneath to be used for storage or alternative purposes when the bed is not in use.

GENERAL DESCRIPTION

Various embodiments of lifts can be used to raise and lower accessories such as beds, kitchenettes, or the like in structures such as vehicles. The lifts can include various combinations of components such as one or more guide rails, one or more carriages coupled to the guide rails, one or more mounting brackets coupled to the carriages, and/or one or more flexible support lines extending across the underside of an accessory such as a bed to support and stabilize the accessory as it moves vertically.

In some embodiments, the lift can be used to raise and lower an object or accessory attached to the bottom of a bed. The accessory can be lowered to the floor and released as needed. This can be done by lowering the accessory until it touches the floor, removing the accessory, and raising the bed. The accessory can be attached to and stowed under the bed by reversing the process.

The mounting bracket used to couple the accessory to the carriage of the lift can be configured to move vertically relative to the carriage to prevent the lift from pushing the accessory forcefully into the floor when it is being lowered causing damage to the accessory and/or the floor. The mounting bracket is configured to move freely in a vertical direction relative to the carriage so that when the accessory reaches the floor, the carriage can continue moving downward relative to the mounting bracket and thus prevent the accessory and/or the floor from being damaged.

In some embodiments, the lift includes an electric motor positioned at the top of a guide rail. The electric motor powers movement of the lift. In some situations, the electric motor may prevent full upward movement of the accessory coupled to the lift. This situation can be addressed by a mounting bracket having a mounting surface that is offset horizontally relative to the carriage so that the vehicle accessory coupled to the mounting bracket can pass by the side of the electric motor and reach a higher position in the raised position. This is particularly useful when the lift is used with cargo trailers, which often have radiused corners where the top of the wall meets the ceiling. The radiused corners often require the electric motor to be positioned much lower on the wall thereby preventing the accessory from being raised as high in the vehicle. This is also particularly useful when the lift is used to lift accessories such as kitchenettes and other components that may not be flat and/or have a height that is greater than that of a bed. In such situations, it is especially beneficial to lift the top surface of the accessory beyond the location of the electric motor and closer to the ceiling of the structure.

In some embodiments, the lift includes a simpler and more flexible support and stabilization system for a bed or other accessory. For example, the lift can include one or more flexible support lines extending upward from a lower anchor point to one side of the bed, across the bed to an opposite side of the bed, and upward from the opposite side of the bed to an upper anchor point. As the moves upward, the one or more flexible support lines keep it approximately horizontal, and/or flat. The lift provides the motive force to move the bed vertically, but the one or more flexible support lines act to keep it stable and fully supported. In some embodiments, the flexible support lines also have the advantage of being up against the wall of the vehicle and out of the way when the bed is in the raised position. The flexible support lines can be used to support one bed in either a single or double bunk configuration or both beds in a double bunk configuration.

In some embodiments, a vehicle includes: a guide rail coupled to a wall of the vehicle, the guide rail being oriented vertically in the vehicle; a carriage coupled to the guide rail, the carriage being movable vertically along the guide rail; and a mounting bracket coupled to the carriage; wherein the mounting bracket is vertically movable relative to the carriage.

In some embodiments, a lift includes: a guide rail having a lengthwise direction, the guide rail being structured to be coupled to a structure in a vertical orientation; a carriage coupled to the guide rail, the carriage being movable along the guide rail in the lengthwise direction; and a mounting bracket coupled to the carriage; wherein the mounting bracket is movable relative to the carriage in the lengthwise direction.

In some embodiments, a bed lift includes: a guide rail having a lengthwise direction, the guide rail being structured to be coupled inside a vehicle in a vertical orientation; a carriage coupled to the guide rail, the carriage being movable along the guide rail in the lengthwise direction; and a mounting bracket coupled to the carriage, the mounting bracket being structured to be coupled to a bed; wherein the mounting bracket is movable relative to the carriage in the lengthwise direction.

In some embodiments, a vehicle includes: a guide rail coupled to a wall of the vehicle, the guide rail being oriented vertically in the vehicle; a carriage coupled to the guide rail, the carriage being movable vertically along the guide rail; an electric motor coupled to the guide rail at the top of the guide rail, the electric motor being configured to power movement of the carriage along the guide rail; a vehicle accessory vertically movable between a lowered position where the vehicle accessory is positioned to be used and a raised position where the vehicle accessory is stowed; and a mounting bracket coupling the vehicle accessory to the carriage, the mounting bracket including a mounting surface to which the vehicle accessory is fastened; wherein the mounting surface is offset horizontally relative to the carriage to allow a side of the vehicle accessory to pass by a side of the electric motor when the vehicle accessory is in the raised position.

In some embodiments, a lift includes: a guide rail having a lengthwise direction, the guide rail being structured to be coupled to a vehicle in a vertical orientation; a carriage coupled to the guide rail, the carriage being movable along the guide rail in the lengthwise direction; an electric motor coupled to the guide rail at the top of the guide rail, the electric motor being configured to power movement of the carriage along the guide rail; a mounting bracket structured to couple a vehicle accessory to the carriage; the mounting bracket including a mounting surface to which the vehicle accessory can be fastened; wherein the mounting surface is offset relative to the carriage and the electric motor.

In some embodiments, a bed lift includes: a guide rail having a lengthwise direction, the guide rail being structured to be coupled inside a vehicle in a vertical orientation; a carriage coupled to the guide rail, the carriage being movable along the guide rail in the lengthwise direction; an electric motor coupled to the guide rail at the top of the guide rail, the electric motor being configured to power movement of the carriage along the guide rail; a mounting bracket structured to couple a bed to the carriage; the mounting bracket including a mounting surface to which the bed can be fastened; wherein the mounting surface is offset relative to the carriage and the electric motor.

In some embodiments, a vehicle includes: a guide rail coupled to a wall of the vehicle, the guide rail being oriented vertically in the vehicle; a bed including a near side coupled to the guide rail and a far side positioned opposite the near side, the bed being vertically movable between a lowered position where the bed is positioned to be used and a raised position where the bed is stowed; and a flexible support line extending upward from a lower anchor point to one side of the bed, across the bed to an opposite side of the bed, and upward from the opposite side of the bed to an upper anchor point; wherein the flexible support line is structured to slide across the bed and hold the bed in an at least approximately horizontal orientation as the bed moves between the lowered position and the raised position; and wherein the far side of the bed is not coupled to a guide rail.

In some embodiments, a bed lift includes: a guide rail structured to be coupled inside a vehicle in a vertical orientation, the guide rail also being structured to be coupled to a bed in the vehicle movable between a lowered position and a raised position and having a near side and a far side, the guide rail being structured to be coupled to the near side of the bed; and at least one flexible support line structured to extend upward from a lower anchor point in the vehicle to one side of the bed, across the bed to an opposite side of the bed, and upward from the opposite side of the bed to an upper anchor point in the vehicle; wherein the at least one flexible support line is structured to slide across the bed and hold the bed in an at least approximately horizontal orientation as the bed moves between the lowered position and the raised position; and wherein the at least one flexible support line is structured to be the only support the far side of the bed in the vehicle.

In some embodiments, a vehicle includes: a lower bed; an upper bed positioned above the lower bed, the lower bed and the upper bed being movable between a lowered position where the lower bed and the upper bed are spaced apart and a raised position where the lower bed and the upper bed are stowed; and a flexible support line extending upward from a lower anchor point to one side of the upper bed, across the upper bed to an opposite side of the upper bed, and upward from the opposite side of the upper bed to an upper anchor point; wherein the flexible support line is structured to slide across the upper bed and hold the upper bed in an at least approximately horizontal orientation as the upper bed moves between the lowered position and the raised position.

In some embodiments, a bed lift includes: a guide rail structured to be coupled inside a vehicle in a vertical orientation, the guide rail also being structured to be coupled to a lower bed and an upper bed in the vehicle that are movable between a lowered position where the lower bed and the upper bed are spaced apart and a raised position where the lower bed and the upper bed are stowed; and a flexible support line structured to extend upward from a lower anchor point in the vehicle to one side of the upper bed, across the upper bed to an opposite side of the upper bed, and upward from the opposite side of the upper bed to an upper anchor point in the vehicle; wherein the flexible support line is structured to slide across the upper bed and hold the upper bed in an at least approximately horizontal orientation as the upper bed moves between the lowered position and the raised position.

In some embodiments, a vehicle includes: a guide rail coupled to a wall of the vehicle, the guide rail being oriented vertically in the vehicle; a bed including a near side coupled to the guide rail and a far side positioned opposite the near side, the bed being vertically movable between a lowered position where the bed is positioned to be used and a raised position where the bed is stowed; and a flexible support line extending upward from a lower anchor point to one side of the bed, across the bed to an opposite side of the bed, and upward from the opposite side of the bed to an upper anchor point; wherein the flexible support line is structured to slide across the bed and hold the bed in an at least approximately horizontal orientation as the bed moves between the lowered position and the raised position; and wherein at least one of the lower anchor point and/or the upper anchor point is on the vehicle and not on a guide rail.

The general description is provided to give a general introduction to the described subject matter as well as a synopsis of some of the technological improvements and/or advantages it provides. The general description and background are not intended to identify essential aspects of the described subject matter, nor should they be used to constrict or limit the scope of the claims. For example, the scope of the claims should not be limited based on whether the recited subject matter includes any or all aspects noted in the general description and/or addresses any of the issues noted in the background.

DESCRIPTION OF DRAWINGS

The preferred and other embodiments are described in association with the accompanying drawings in which.

DETAILED DESCRIPTION OF EMBODIMENTS

Figure 1:
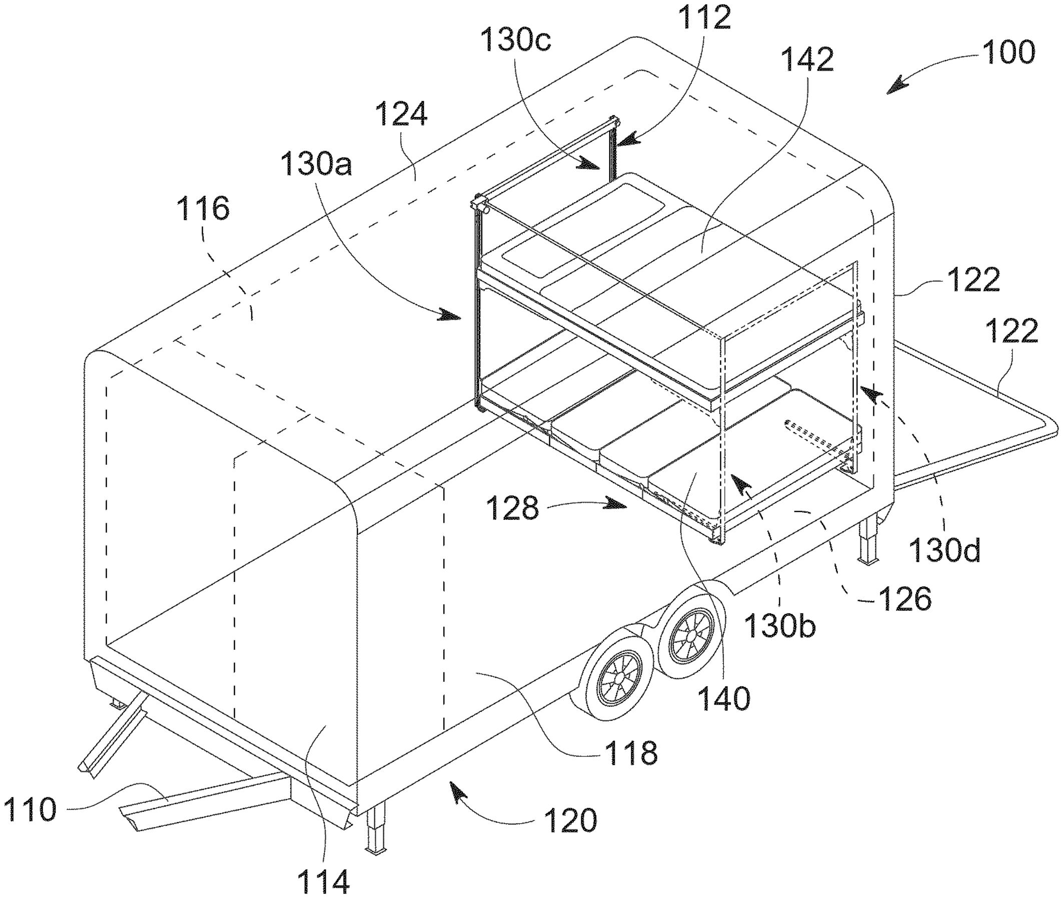
FIG. 1 is a perspective view of one embodiment of a toy hauler recreational vehicle with bunk beds positioned in a cargo area.

FIG. 1 shows one embodiment of a “toy hauler” type of recreational vehicle 100 including a lift 112 (alternatively referred to as a lifting system, lifting mechanism, vertical sliding system, or vertical support system) configured to lift a first or lower bed 140 (alternatively referred to as a bunk or berth) and a second or upper bed 142 (alternatively referred to as a bunk or berth) positioned above the lower bed 140. The vehicle 100 includes a vehicle body 120 which is coupled to a frame 110. The vehicle body 120 includes a front wall 114, a first side wall 116, a second side wall 118 positioned opposite the first side wall 116, a rear wall 122 positioned opposite the front wall 114, a ceiling 124, and a floor 126.

The vehicle 100 also includes a cargo area 128 capable of receiving and/or transporting off-road vehicles such as side-by-side ATVs, four-wheelers, motorcycles, snowmobiles, dune buggies, personal watercraft, and the like to various destinations. In the embodiment shown in FIG. 1, the rear wall 122 is used as both a door to enter the vehicle 100 and as a ramp to move an off-road vehicle into and/or out of the cargo area 128. Although, the entire rear wall 122 is shown as forming the ramp, in other embodiments, less than all of the rear wall 122 may be used as a door and/or ramp—e.g., the rear wall 122 defines a frame in which a door is positioned that opens as a ramp or pivots open sideways (e.g., on a vertical axis).

FIG. 1 shows the lift 112 being used to life one or more beds. It should be appreciated, however, that the lift 112 can be used to lift a variety of objects in a variety of settings. For example, the lift can be used to lift objects or items such as furniture (e.g., seating units such as sofas, couches, chairs, benches, and the like; sleeping units such as beds, mattresses, and the like; dining units such as dinettes, tables, counters, and the like; desks; workbenches; entertainment centers; and the like), appliances (e.g., heating units such as stoves, microwaves, toaster ovens, and the like; refrigerators; dishwashers; and the like), storage units (e.g., cupboards, cabinets, counters, shelves, and the like), sinks, platforms (e.g., platform which is used to raise and/or lower an off-road vehicle positioned in the vehicle 100).

FIG. 1 shows the lift 112 in a toy hauler recreational vehicle. It should be appreciated, however, that the lift 112 can be used with a wide variety of other mobile and immobile structures. Examples of mobile structures include, but are not limited to, structures such as land vehicles (e.g., recreational vehicles, trailers, motorized vehicles, vehicles used to travel on a road, wheeled vehicles, railroad cars, buses, semi-trucks, and the like), watercraft (e.g., ships, boats, houseboats, cruise ships, yachts, and the like), aircraft, and any other mobile vehicles. Examples of immobile structures include, but are not limited to, structures such as a building, edifice, etc.

The lift 112 is especially suitable for use with structures that have or can be used as living quarters. For example, the lift 112 can be used with any of the mobile and immobile structures previously described which can be used as living quarters. Structures which can be used as living quarters include, but are not limited to, homes, houses, residences, condominiums, abodes, dwellings, lodgings, recreational vehicles (e.g., travel trailers, fifth wheels, truck campers, “toy haulers,” snowmobile trailers, motor homes, car haulers (e.g., vehicles used to haul cars and/or other vehicles to races such as NASCAR races, etc.) and the like), houseboats, cruise ships, and the like. The lift 112 can be used with any structure that is suitable for or designed principally for habitation by people either on a permanent (e.g., a house) or a temporary (e.g., hotel) basis.

It should be appreciated that the concepts and features associated with the described embodiments can be used in a variety of settings and situations in addition to those explicitly described. Also, the features, advantages, characteristics, etc. of one embodiment of the lift 112 can be combined with the features, advantages, characteristics, etc., of any one or more other embodiments, including those described in the incorporated documents, to form additional embodiments unless stated otherwise.

The lift 112 includes lifting assemblies 130*a*, 130*b*, 130*c*, 130*d* (collectively or generically referred to as "lifting assemblies 130;" alternatively referred to as sliding assemblies or sliding mechanisms), a drive member 134 (alternatively referred to as a synchronizing assembly, synchronizing member, timing assembly, or drive shaft), cross members 132, and a motor assembly 136 coupled to the top of the lifting assembly 130*a*. The lifting assemblies 130*a*, 130*c* are coupled to the first side wall 116, and the lifting assemblies 130*b*, 130*d* are coupled to the second side wall 118.

The cross members 132 are coupled between the lifting assemblies 130*a*, 130*c* and the lifting assemblies 130*b*, 130*d*, respectively. Each cross member 132 conceals a flexible drive member 162 such as a chain, cable, toothed belt, or strap that synchronizes movement of the adjacent lifting assemblies 130*a*, 130*c* and 130*b*, 130*d*. The cross member 132 can be coupled to the lifting assemblies 130*a*, 130*c* or to the lifting assemblies 103*b*, 130*d* to form a rigid or semi-rigid structure that can be easily coupled to the side walls 116, 118.

The drive member 134 extends from the motor assembly 136 at the top of the lifting assembly 130*a* to the top of the lifting assembly 130*c*. The drive member 134 synchronizes movement of the pair of lifting assemblies 130*a*, 130*c* coupled to the first side wall 116 and the pair of lifting assemblies 130*b*, 130*d* coupled to the second side wall 118. The motor assembly 136 drives or powers movement of the lifting assemblies 130.

The motor assembly 136 includes an electric motor that provides power to operate the lifting assemblies 130. It should be appreciate that the electric motor can have any suitable structure and/or configuration. For example, in some embodiments, the electric motor is a 12V electric motor that is suitable for use in vehicles such as RVs. In other embodiments, the electric motor can be a different voltage DC motor or an AC motor that is suitable for use in a structure wired with AC power.

The lift 112 in FIG. 1 includes four lifting assemblies 130. However, it should be appreciated that the lift 112 can include any suitable number of lifting assemblies 130 positioned in any suitable configuration. For example, the lift 112 can include one, two, three, or more than four lifting assemblies 130. Likewise, the lifting assemblies 130 can be coupled to only one side wall, opposing side walls, and/or on side walls positioned perpendicular to each other. For example, the lift 112 can include two lifting assemblies 130 coupled to the same side wall or one lifting assembly 130 coupled to one side wall and another lifting assembly coupled to another side wall positioned perpendicular to the one side wall.

Figure 2:
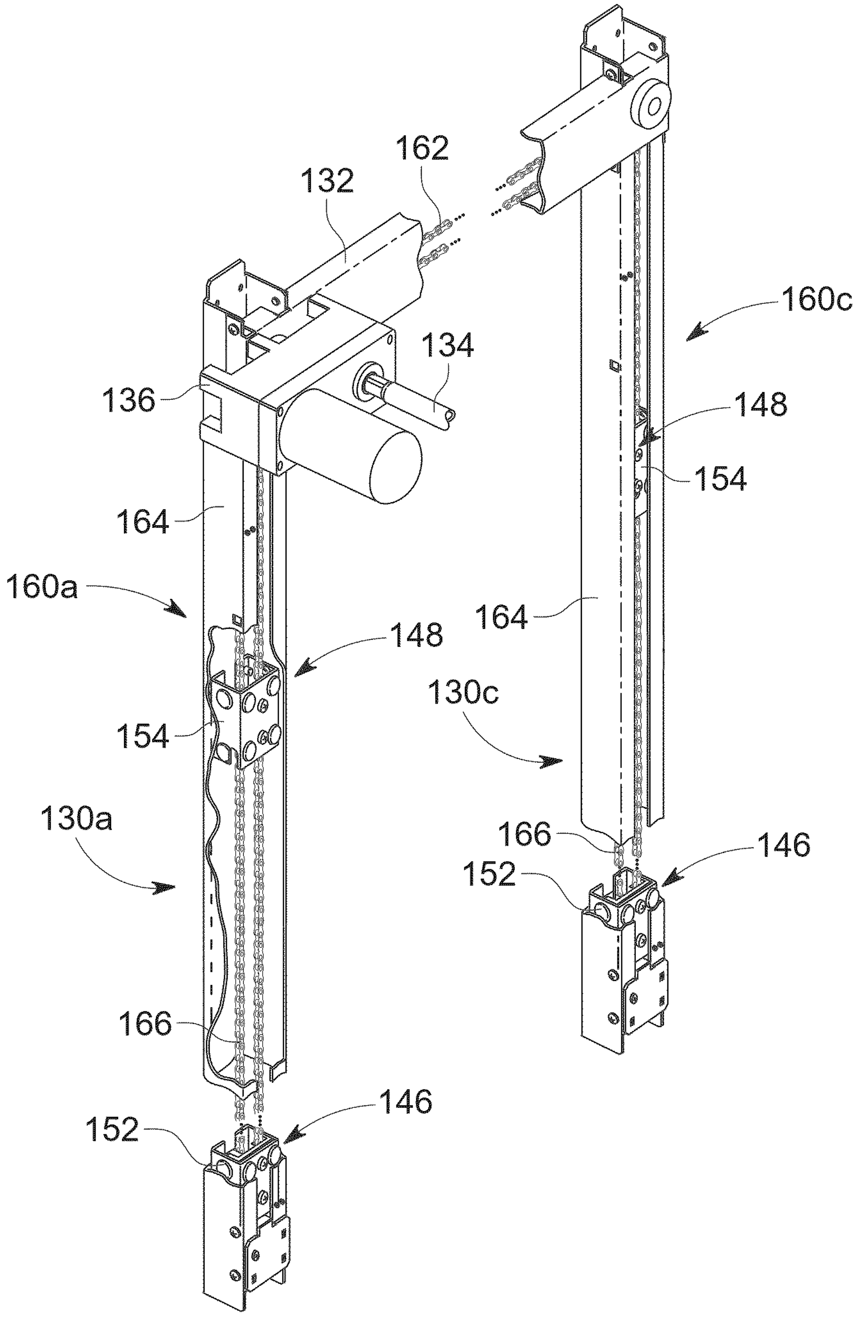
FIG. 2 is a partially cut-away perspective view of one embodiment of the left half of the lift in FIG. 1.

FIG. 2 is a partially cut-away perspective view of the lifting assemblies 130*a*, 130*c* coupled to the first side wall 116 and coupled to each other with the cross member 132. The lifting assemblies 130*b*, 130*d* are a mirror image of the lifting assemblies 130*a*, 130*c* and are configured similarly to the lifting assemblies 130*a*, 130*c*. The description of the lifting assemblies 130*a*, 103*c* applies equally to the lifting assemblies 130*b*, 130*d*.

Each lifting assembly 130 includes a lower moving assembly 146 (alternatively referred to as a lower sliding unit or lower moving guide assembly), and a guide assembly 160 (alternatively referred to as a support assembly). The lifting assembly 130 may optionally include an upper moving assembly 148 (alternatively referred to as an upper sliding unit or upper moving guide assembly). The lower moving assembly 146 is coupled to the lower bed 140 and the upper moving assembly 148 is coupled to the upper bed 142. The moving assemblies 146, 148 can be configured to cooperate with the corresponding guide assemblies 160 to raise and lower the beds 140, 142 between the various configurations. For example, the moving assemblies 146, 148 slidably cooperate with the guide assemblies 160 to raise and lower the beds 140, 142.

The lifting assemblies 130 can have a variety of structures and/or configurations including any suitable number of moving assemblies. For example, in some embodiments, each lifting assembly 130 includes a separate moving assembly coupled to each object coupled to the lifting assembly 130. For example, if the lift 112 includes two lifting assemblies 130 and is configured to lift three beds, then each of the two lifting assemblies 130 can include three moving assemblies with each moving assembly being coupled to one of the three beds.

It should be appreciated that the moving assemblies 146, 148 and any other moving assemblies in the lifting assembly 130 can have any suitable design or structure. For example, the moving assemblies in a given lifting assembly 130 can be the same or different. In some embodiments, the lower moving assembly 146 can be configured differently than the upper moving assembly 148. Likewise, if there are three moving assemblies, they can have the same structure, different structures, or two of them can have the same structure and one can have a different structure.

Figure 3:
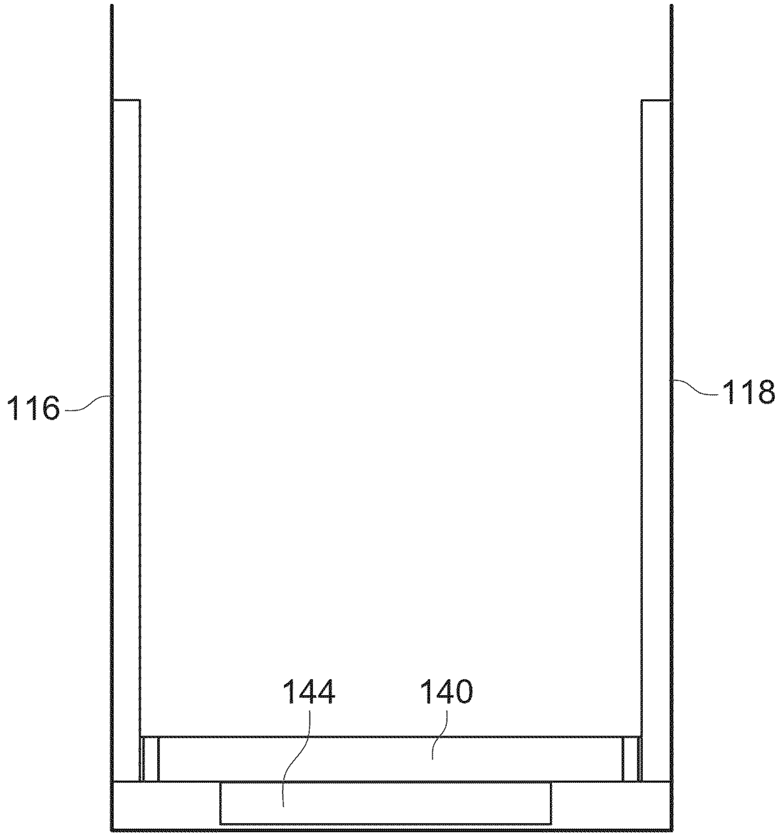
FIG. 3 is a front view of one embodiment of a lift coupled to the walls of the toy hauler with the bed in a lowered position so that an accessory coupled to the bottom of the bed is resting on the floor of the toy hauler.

With reference to FIGS. 2-3, each lower moving assembly 146 includes a mounting bracket 156 coupled to a lower carriage 152 (alternatively referred to as a moving member, housing, moving guide member, sliding member, or trolley). The lower carriage 152 is coupled to the lower bed 140. Each upper moving assembly 148 includes an upper mounting bracket coupled to an upper carriage 154 (alternatively referred to as a moving member, housing, moving guide member, sliding member, or trolley). The upper carriage 154 is coupled to the upper bed 142.

It should be appreciated that the mounting brackets and carriages can have any suitable design or structure. For example, they can be structured in the manner shown and described in this document. They can also be structured in any of the ways shown and/or describe in the incorporated documents.

With continued reference to FIG. 2, each guide assembly 160 includes a guide rail 164 (alternatively referred to as a guide member, support member, or stanchion) coupled to one of the side walls 116, 118 of the vehicle 100 in a vertical orientation. The carriages 152, 154 are coupled to the guide rail 164 in a manner that allows them to move vertically relative to the guide rail 164. The carriages 152, 154 cooperate with the guide rail 164 to move the beds 140, 142 between the lowered position and the raised position. In one embodiment, the guide rail 164 defines a channel sized to slidably receive the carriages 152, 154. For example, the guide rail 164 can have a C-shaped cross section that forms the channel and slidably receives the carriages 152, 154.

Each lifting assembly 130 includes a flexible drive member 166 that is used to drive movement of the one or more of the carriages 152, 154 in cooperation with the guide rail 164. The motor assembly 136 provides power to move the flexible drive members 162, 166, and the drive member 134 so that the lifting assemblies 130 operate in unison to raise or lower the beds 140, 142.

The flexible drive members 166 form endless loops in the guide rails 164. The flexible drive member 166 in each endless loop travels along an endless path. For example, as shown in FIG. 2, the flexible drive member 166 forms an endless loop which extends between an upper and a lower end of the lifting assembly 130. The endless loops formed by the flexible drive members 166 are generally oriented vertically in a plane that is parallel to the side walls 116, 118.

It should be appreciated that the flexible drive members 166 can have a variety of structures and/or configurations. For example, in some embodiments, the flexible drive members 166 can be formed partially or entirely by a roller chain that engages corresponding sprockets. Also, the flexible drive members 166 can have any of the structures and/or configurations described in the incorporated documents.

The lift 112 moves the lower bed 140 and the upper bed 142 between various configurations. For example, the lift 112 can move the beds 140, 142 between the following configurations: (1) a double bunk configuration (FIG. 1) where the lower bed 140 and the upper bed 142 are in a lowered position and oriented horizontally to receive one or more persons to sleep thereon, (2) a single bunk configuration where the lower bed 140 is in the lowered position and the upper bed 142 is in a raised position. (3) a seating configuration where the lower bed 140 is in the lowered position and forms one or two seating units, each of which has a seat base and a seat back, and the upper bed 142 is in the raised position, (4) a first stowed configuration where the lower bed 140 and the upper bed 142 are in a raised position and oriented horizontally adjacent to the ceiling 124 of the vehicle 100, and (5) a second stowed configuration where the one or both halves of the lower bed 140 are stowed in an upright position adjacent to the side walls 116, 118 of the vehicle 100 and the upper bed 142 is in the raised position.

It should be appreciated that the lift 112 can be used to move the beds 140, 142 between other configurations including any of the configurations described in the incorporated documents. It should also be appreciated that the configurations can be modified by removing one of the beds—e.g., the upper bed 142—or by adding additional beds. For example, the seating configuration and the stowed configurations described above can be modified by removing the upper bed 142 so that only the lower bed 140 is present. Likewise, the various configurations can be modified by adding one or more additional beds positioned above the upper bed 142. In this way, a triple bunk configuration can be achieved by lowering all the beds and a single bunk configuration can be achieved by lowering only the lower bed 140 and keeping the other beds in the raised position.

In some embodiments, the lift 112 can reciprocally and at least translationally move the beds 140, 142 between the lowered position and the raised position. Translational movement refers to motion of a body where every point of the body moves parallel to and the same distance as every other point of the body.

FIG. 3 is a front view of the lift 112 with an object 144 coupled to the bottom or underside of the lower bed 140 with the lower bed 140 in a lowered position. The object 144 can be anything that is desirable to raise or lower in the vehicle 100. Examples of such objects include any of those described above as being capable of being raised and lowered with the lift 112. For example, in some embodiments, the object can be an item of furniture.

The lift 112 is configured so that the object 144 rests on the floor 126 of the vehicle 100 when the lower bed 140 is in the lowered position. This is especially desirable for objects 144 that are heavy or bulky making it difficult to lift them while coupling or decoupling them from the underside of the lower bed 140.

Figure 4:
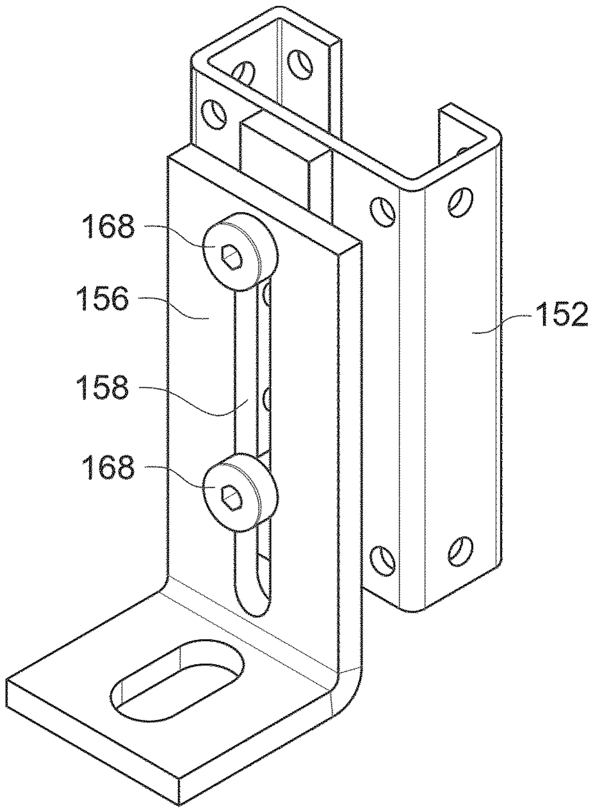
FIG. 4 is a perspective view of one embodiment of a mounting bracket and carriage that move vertically in the lift in FIG. 1.

FIG. 4 is a perspective view of one embodiment of the lower carriage 152 and the mounting bracket 156 that can be used to couple the lower bed 140 in FIG. 3 to the lifting assemblies 130. The mounting bracket 156 and the lower carriage 152 are coupled together in a manner that allows the mounting bracket 156 to move vertically relative to the lower carriage 152.

This is advantageous because it provides some leeway or play so that the lifting assembly 130 does not need to stop at the exact moment the object 144 reaches the floor 126. Instead, the object 144 can reach the floor 126 and the lower carriage 152 can continue moving downward a distance before stopping.

Figure 5:
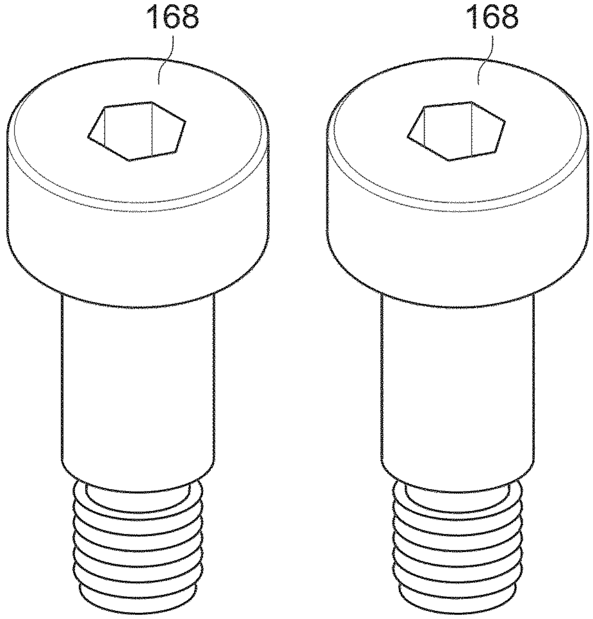
FIG. 5 is a perspective view of one embodiment of shoulder bolts that can be used to couple the mounting bracket to the carriage in FIG. 4.

The mounting bracket 156 is coupled to the lower carriage 152 with fasteners 168 that extend through a slot 158 in the mounting bracket 156. It should be appreciated that any suitable fasteners 168 can be used. In one embodiment, the fasteners 168 are shoulder bolts such as those shown in FIGS. 4-5. The fasteners 168 can have threaded ends that are received by threaded holes in the front side of the lower carriage 152.

The fasteners 168 and corresponding slot 158 allow the mounting bracket 156 to slide vertically relative to the lower carriage 152. The amount of travel of the mounting bracket 156 relative to the lower carriage 152 is the difference between the length of the slot 158 minus the distance the fasteners 168 are spaced apart.

It should be appreciated that the mounting bracket 156 and the lower carriage 152 can be structured and/or configured in a variety of other ways to allow the mounting bracket 156 to move vertically relative to the lower carriage 152. For example, in some embodiments, the slot can be positioned in the lower carriage 152 and the threaded holes can be in the mounting bracket 156. Numerous other structures and/or configurations are possible as well.

Figure 6:
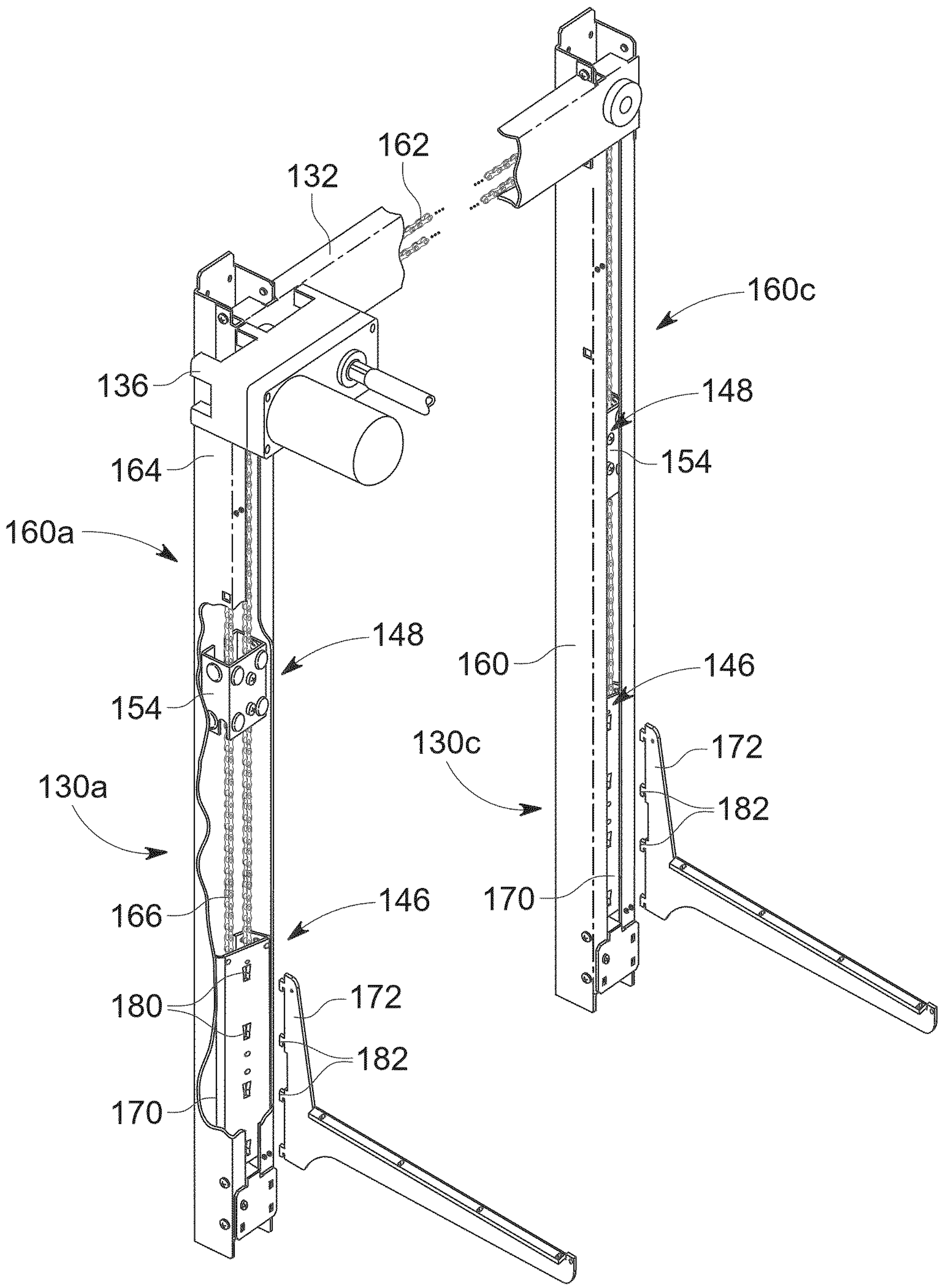
FIG. 6 is a partially cut-away perspective view of another embodiment of the left half of the lift in FIG. 1.

FIG. 6 shows a perspective view of another embodiment of the lift 112 where each of the lower moving assemblies 146 includes a lower carriage 170 and a mounting bracket 172 that are different than the lower carriage 152 and the mounting bracket 156 described above. The lower carriage 170 is longer than the lower carriage 152 and includes a series of holes 180 sized to receive projections or tabs 182 protruding outward from the mounting bracket 172. In this way, the mounting bracket 172 can be quickly and easily coupled to and decoupled from the lower carriage 170 without the use of tools.

The mounting bracket 172 is structured to be especially suitable for use in situations where the lift 112 only includes the lifting assemblies 130*a*, 130*c* and does not include the lifting assemblies 130*b*, 130*d*. For example, a near side of the lower bed 140 can be coupled to the lifting assemblies 130*a*, 130*c* and a far side of the lower bed 140 may not be coupled to a lifting assembly.

Figure 7:
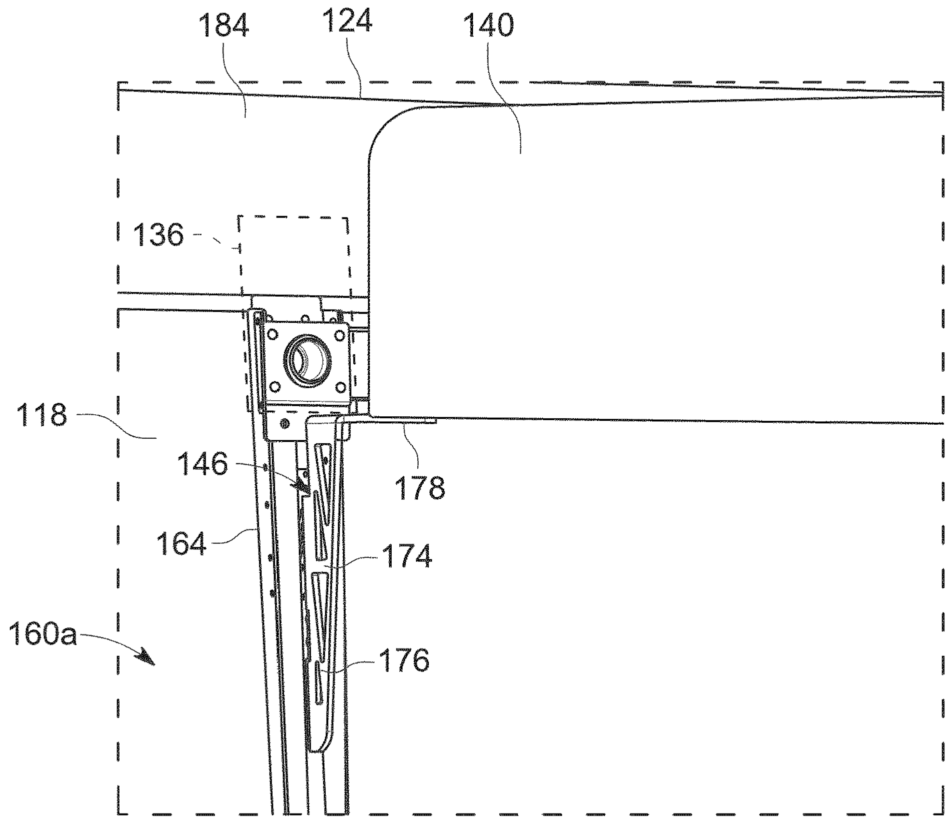
FIG. 7 is a perspective view of one embodiment of a mounting bracket having an offset mounting surface that is used to couple a bed to the lift and allow the bed to travel upward to the side of an electric motor (not shown).
Figure 8:
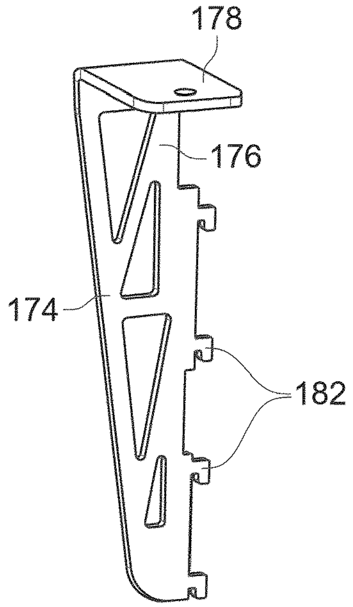
FIG. 8 is a perspective view of the mounting bracket in FIG. 7.

FIG. 7 shows a perspective view of another embodiment of the lift 112 where the moving assembly 146 includes the lower carriage 170 and a mounting bracket 174. FIG. 8 shows a perspective view of the mounting bracket 174 separately from the rest of the lift 112.

The mounting bracket 174 includes a vertical section 176 and a mounting surface 178 that extends outward horizontally from the vertical section 176. When the mounting bracket 174 is mounted to the Lower carriage 170 the mounting surface 178 is offset horizontally relative to the lower carriage 170. The vertical section 176 shares some similarities with the vertical section of the mounting bracket 172. For example, the vertical section 176 includes the projections 182 structured to be received by the holes 180 in the lower carriage 170.

One of the advantages of the mounting bracket 174 is that it allows the lower bed 140 (or the bed that is the uppermost bed) to travel upward and pass by the motor assembly 136 so that the lower bed 140 can be positioned closer to the ceiling 124 of the vehicle 100. This is especially desirable when the vehicle 100 has a relatively large radiused surface 184 where the side wall 116 meets the ceiling 124. The radiused surface 184 prevents the lifting assembly 130 and the attached motor assembly 136 from being positioned close to the ceiling 124. Mounting the lower bed 140 to the lifting assembly 130 so that it is offset and no longer underneath the motor assembly 136 makes it possible to raise the lower bed 140 higher and provide additional clearance under the lower bed 140.

In some embodiments, the mounting surface 178 of the mounting bracket 174 is structured to be offset from the lifting assembly 130*a* in a direction that is towards the lifting assembly 130*a*. The lifting assembly 130*c* can also include an offset mounting bracket on the lower carriage 170. Likewise, the lifting assembly 130*c* can include a mounting bracket that is not offset such as any of those shown in FIGS. 4, 6, or in any of the incorporated documents.

Figure 9:
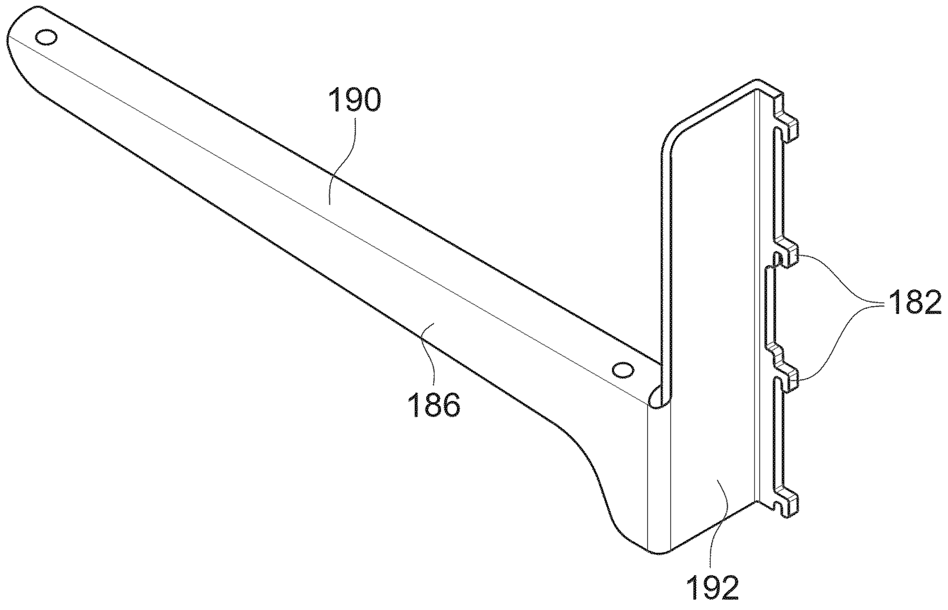
FIGS. 9-10 are perspective views of different embodiments of mounting brackets that can be used to couple a vehicle accessory to the lift in FIG. 1.

FIG. 9 is a perspective view of another embodiment of a mounting bracket 186 that can be coupled to the lower carriage 170 of the lifting assembly 130*a*. The mounting bracket 186 includes the projections 182 and can be coupled to the lower carriage 170 in a similar manner as the mounting bracket 172.

The mounting bracket 186 includes a mounting surface 190 and a vertical section 192. The projections 182 extend outward from one side of the vertical section 192 and the mounting surface 190 extends outward from an opposite side of the vertical section 192. This has the effect of offsetting the mounting surface 190 horizontally relative to the lower carriage 170. In this way, an object coupled to the mounting surface 190 can be moved to a raised position above and to the side of the motor assembly 136.

Figure 10:
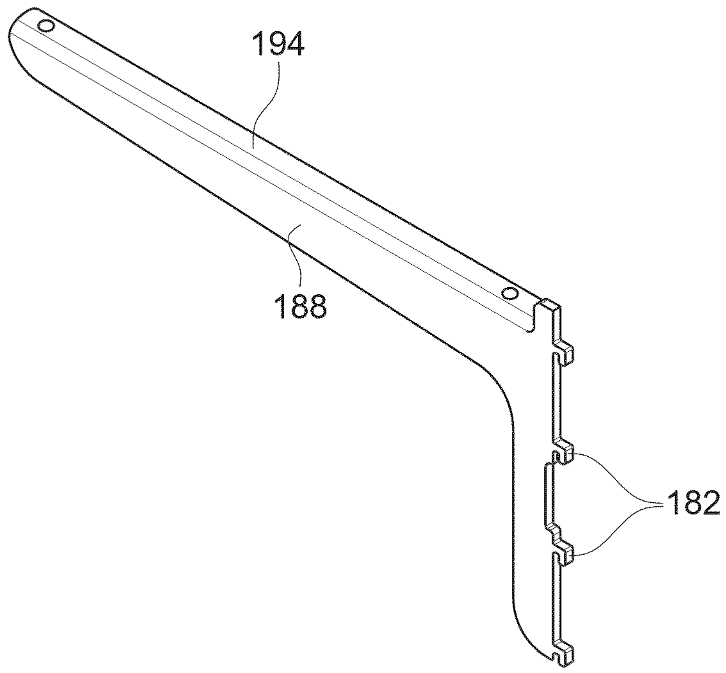

FIG. 10 is a perspective view of another embodiment of a mounting bracket 188 that can be coupled to the lower carriage 170 of the lifting assembly 130*c*. The mounting bracket 188 includes the projections 182 and can be coupled to the lower carriage 170 in a similar manner as the mounting bracket 172. The mounting bracket 188 includes a mounting surface 194 that is in line with and not offset relative to the lower carriage 170. In this way, the mounting bracket 188 is similar to the mounting bracket 172.

FIGS. 11-16 show various views of one embodiment of the lift 112 being used to raise and lower a vehicle accessory in the form of a dinette 196 including a microwave 198, a cooktop 200, a countertop 202, and a drawer 204. It should be appreciated that the structure and/or configuration of the dinette 196 can vary widely compared to what is shown in FIGS. 11-16. For example, the dinette 196 can be modified to include a sink area or the cooktop 200 can be eliminated and the countertop 202 enlarged. Numerous modifications are possible.

The lift 112 can include the lifting assemblies 130*a*, 130*c* with the lower carriages 170 and the mounting brackets 186, 188, respectively. The mounting bracket 186 allows the dinette 196 to offset from the lower carriage 170 and/or the motor assembly 136 in the manner shown in the Figs. This makes it possible to raise the dinette 196 higher because it can pass by the side of the motor assembly 136 and be positioned closer to the ceiling 124 of the vehicle 100. It is especially desirably to raise the dinette 196 as much as possible so that the portion of the dinette 196 that has the most height—i.e., the portion with the microwave 198—is as far off the floor 126 as possible.

Figure 11:
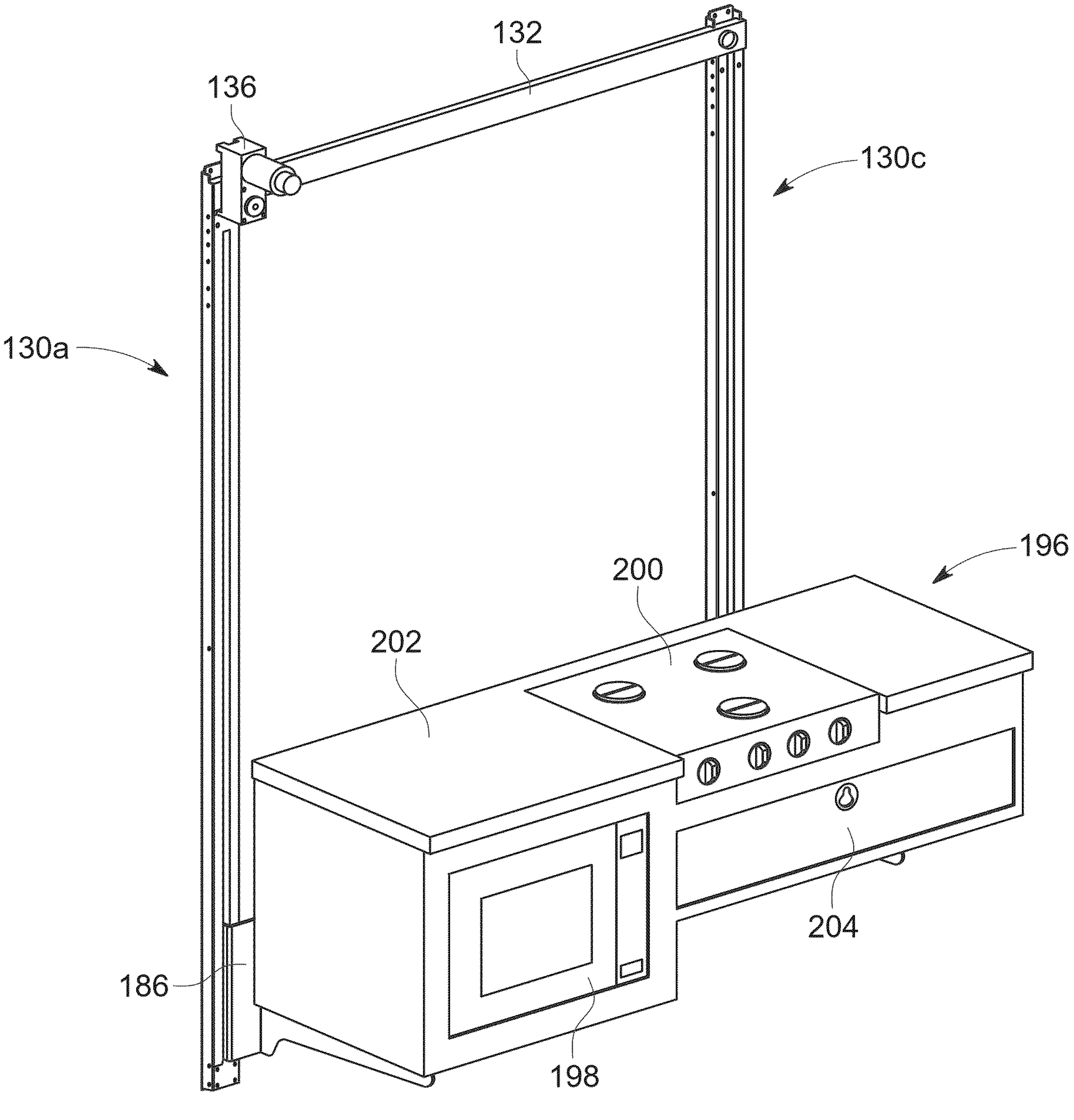
FIG. 11 is a perspective view of another embodiment of the lift in FIG. 1 configured to lift a kitchenette with the kitchenette in a lowered position.
Figure 12:
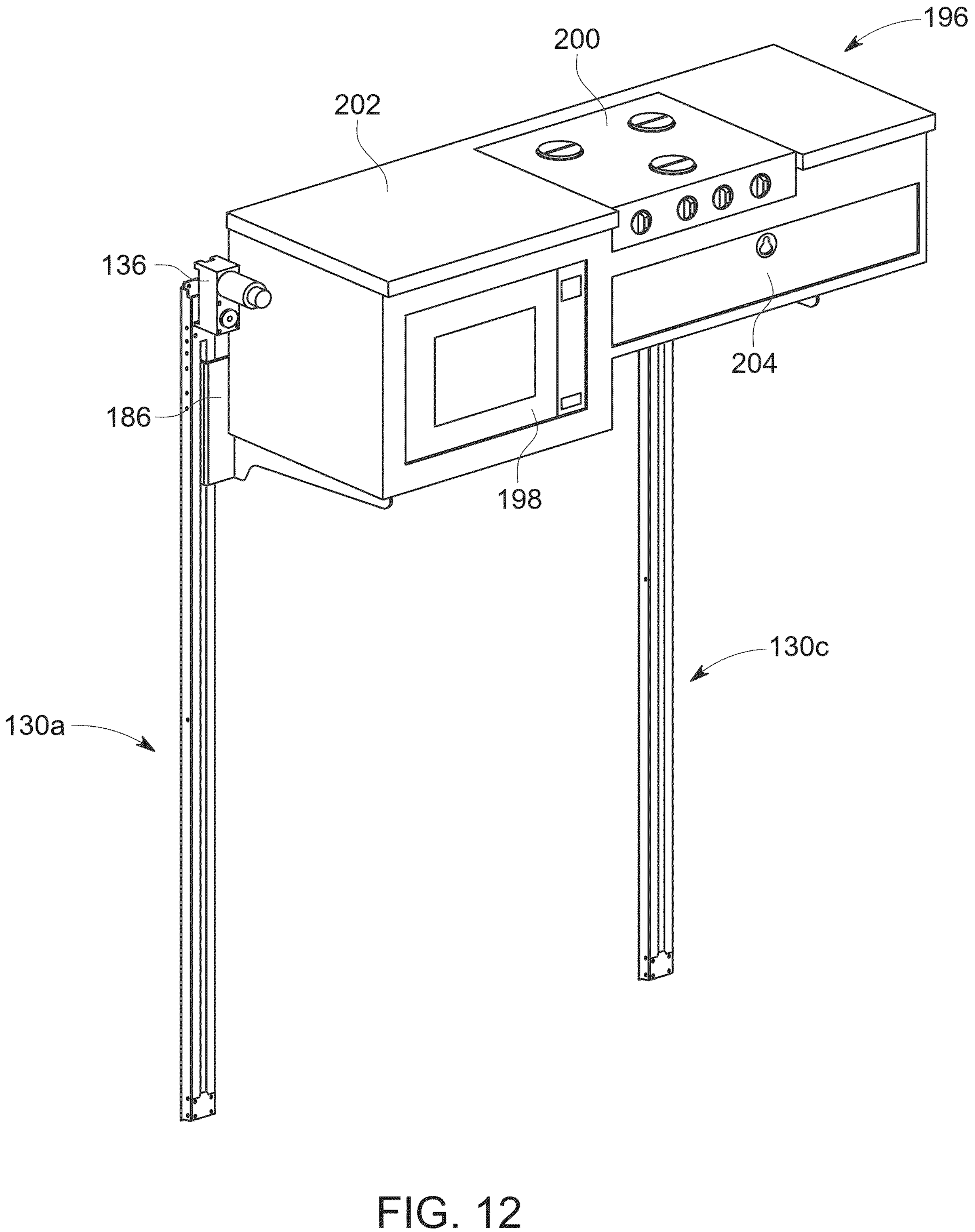
FIGS. 12-13 are perspective views of the lift in FIG. 11 with the kitchenette in a raised position.
Figure 13:
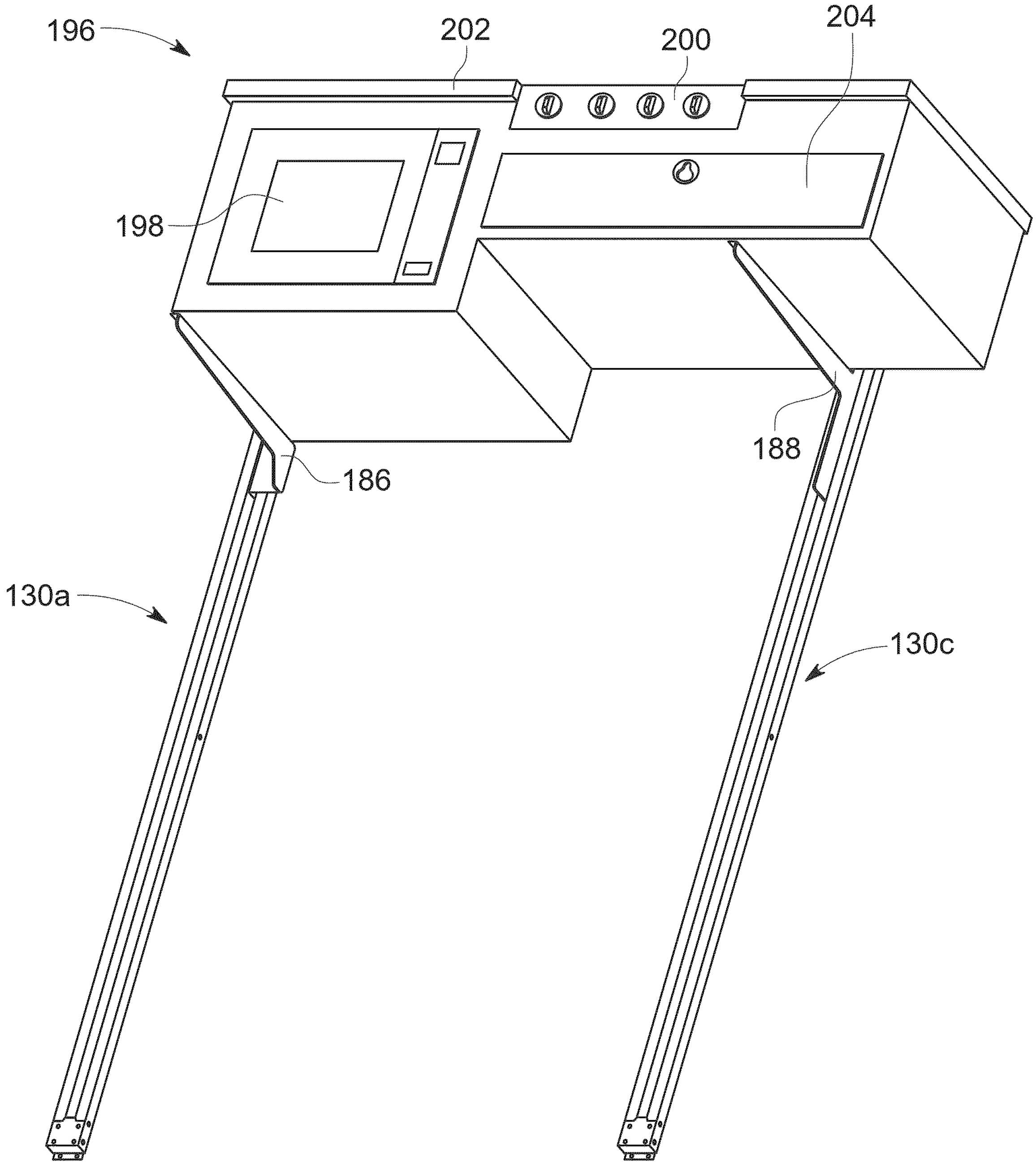
Figure 14:
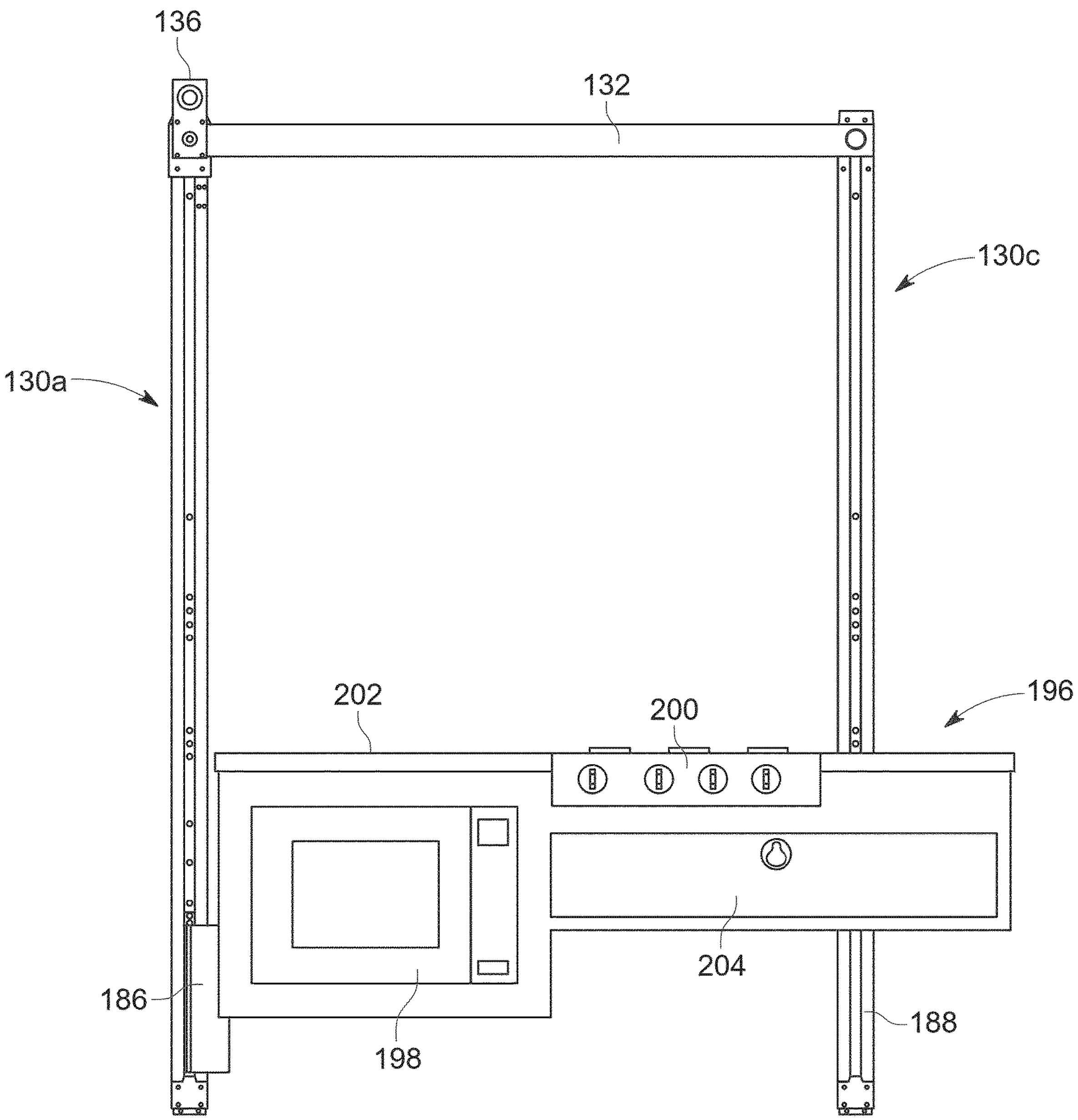
FIG. 14 is a front view of the lift in FIG. 11 with the kitchenette in the lowered position.
Figure 15:
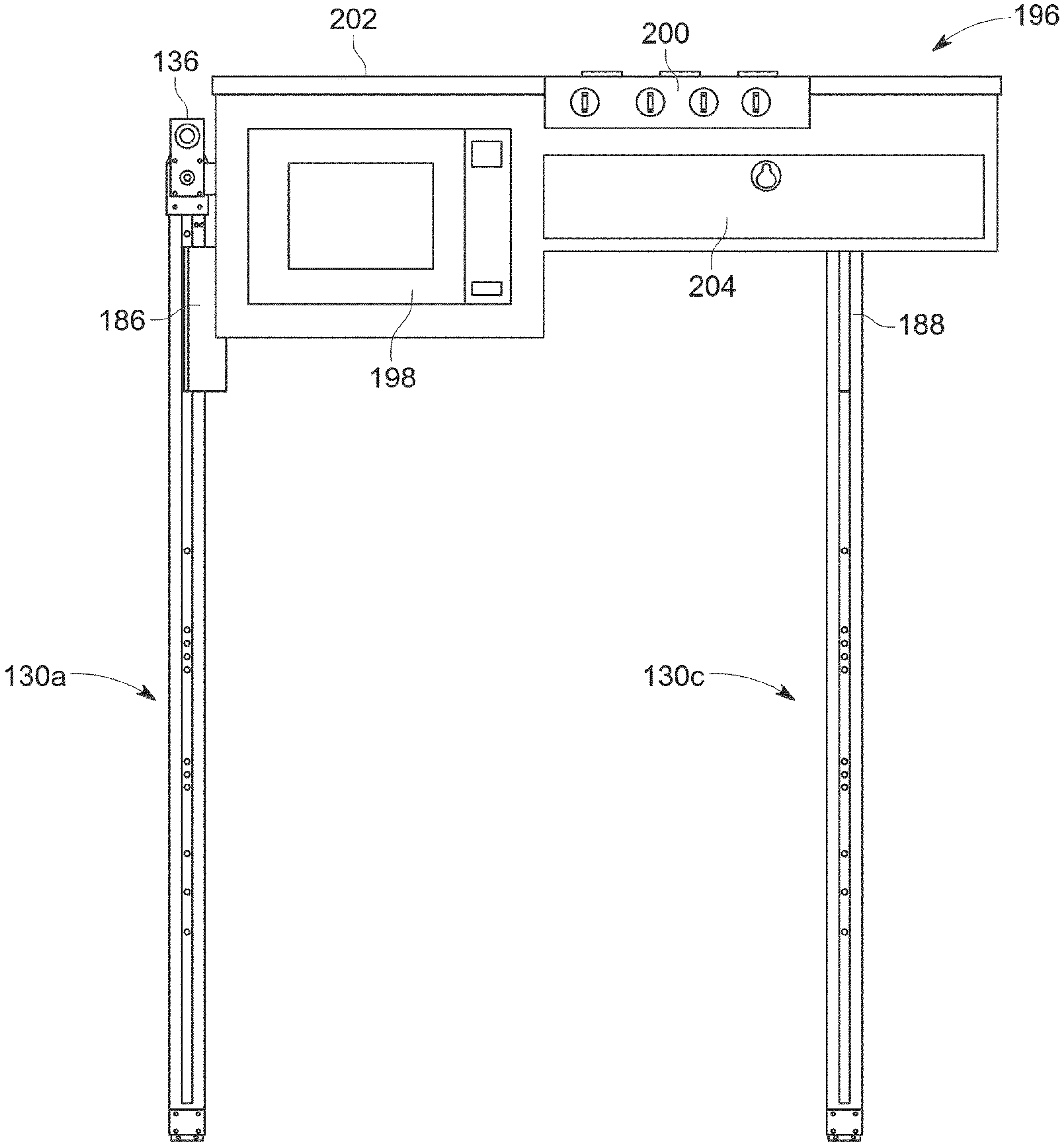
FIG. 15 is a front view of the lift in FIG. 11 with the kitchenette in the raised position.
Figure 16:
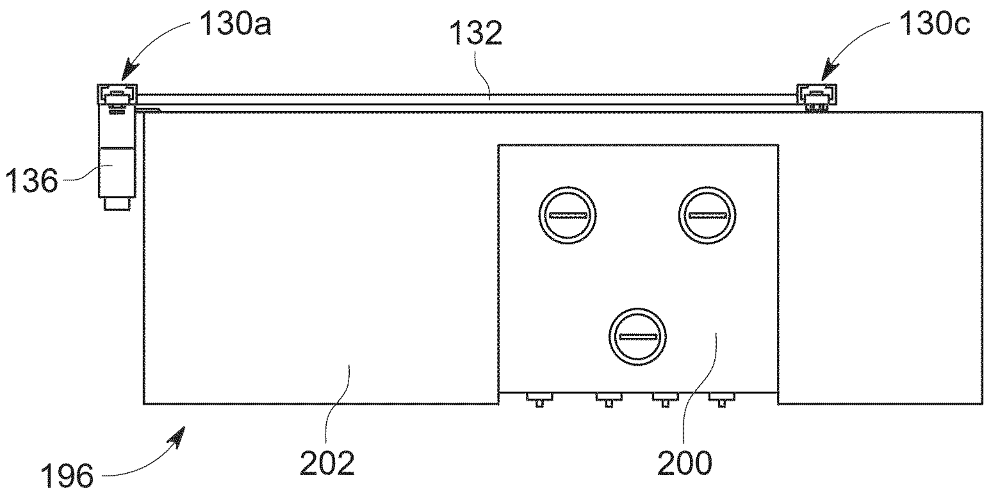
FIG. 16 is a top view of the lift in FIG. 11.

The lift 112 can move the dinette 196 between a variety of positions. For example, the lift 112 can move the dinette 196 between a lowered position as shown in FIGS. 11 and 14, a raised position as shown in FIGS. 12, 13, and 15, and any position in-between. The configuration of the mounting brackets 186, 188 is such at the mounting surfaces 190, 194 are at different heights to accommodate the uneven bottom surface of the dinette 196.

FIGS. 17-28 show another embodiment of the lift 112 that includes the lifting assemblies 130*a*, 130*c* and a bed support and stabilization system having two flexible support lines 210 (alternatively flexible support members) to raise and lower the lower bed 140. In this embodiment, the lift 112 is used to raise and lower a single bed—i.e., the lower bed 140. A near side of the lower bed 140 is coupled to the lifting assemblies 130*a*, 130*c* and a far side of the lower bed 140 is not coupled to any lifting assemblies 130. The lifting assemblies 130*a*, 130*c* can be configured in any of the ways described previously.

The flexible support lines 210 are anchored to the side wall 116 at a lower anchor point 212. The flexible support lines 210 extend upward from the lower anchor point 212 to the near side of the lower bed 140, across the underside of the lower bed 140 to the far side of the lower bed 140, and upward from the far side of the lower bed 140 to an upper anchor point 214 located on the ceiling 124.

The flexible support lines 210 can be coupled to the vehicle 100 at the anchor points 212, 214 using any suitable fasteners and/or fastening method. For example, in some embodiments, the flexible support lines 210 are coupled to the vehicle 100 at the anchor points 212, 214 with screws such as lag screws.

The flexible support lines 210 can be routed over or through low friction brackets 216 coupled to the sides of the lower bed 140 and/or the side walls 116, 118, the ceiling 124, and/or the floor 126 of the vehicle 100. In some embodiments, the low friction brackets 216 have no moving parts and merely provide a low friction surface over which the flexible support lines 210 can slide. In other embodiments, the low friction brackets 216 can include a pulley or other surface that rotates as the flexible support lines 210 move relative to the lower bed 140. Examples of suitable low friction brackets 216 are shown in FIGS. 17-28.

The flexible support lines 210 can also be coupled to the ceiling 124 with support brackets 218. The support brackets 218 are positioned directly above the far side of the lower bed 140. The flexible support lines 210 extend through the support brackets 218 to the upper anchor point 214. The allows the upper anchor point 214 to be adjusted as needed to accommodate various size beds and maintain the desired tension in the flexible support lines 210 while maintaining a fixe vertical mounting location at support brackets 218.

The flexible support lines 210 are structured to support the entire lower bed 140 in any vertical position, but especially the far side of the lower bed 140 that is not coupled to a lifting assembly 130. When the near side of the lower bed 140 is raised or lowered, the force of gravity on the lower bed 140 causes the flexible support lines 210 to slide across the underside of the lower bed 140 and maintain the bed in a horizontal orientation.

The use of the flexible support lines 210 provides a number of advantages. One advantage is that when the lower bed 140 is in the raised position, the area under the far side of the lower bed 140 is unencumbered by any lifting mechanisms or devices. There is nothing to inhibit free movement of people, equipment, or the like in the area. Another advantage is that it is a much simpler and inexpensive way to fully support the far side of the lower bed 140 compared to the use of the lifting assemblies 130*b*, 130*d*.

The flexible support lines 210 can be made of any suitable material and have any suitable configuration. For example, in some embodiments, the flexible support lines 210 can be made of a low friction fabric strap material and have the shape shown in FIGS. 17-28. In other embodiments, the flexible support lines 210 can be made of cable, wire, chain, or the like.

It should also be appreciated that the flexible support lines 210 can be configured to support the lower bed 140 in a variety of ways. For example, in some embodiments, the flexible support lines 210 can extend underneath the lower bed 140 as shown in FIGS. 17-28. In other embodiments, the flexible support lines 210 can extend through the lower bed 140.

FIGS. 17-28 show the lift 112 with two flexible support lines 210. It should be appreciated, however, that the lift 112 can include a single flexible support line 210 or more than two flexible support lines 210 such as three, four, five, etc. flexible support lines 210.

It should also be appreciated that the flexible support lines 210 can be anchored to the vehicle 100 in a variety of ways. For example, the flexible support lines 210 can be anchored to any combination of the side walls 116, 118, the ceiling 124, and/or the floor 126. For example, in some embodiments, the flexible support lines 210 can be anchored at a first anchor point at the top of the side wall 116, extend downward to the near side of the lower bed 140, extend across the underside of the lower bed 140 to the far side, and extend downward to the second anchor point on the floor 126. Numerous variations are possible in the way that the flexible support lines 210 are anchored.

Figure 17:
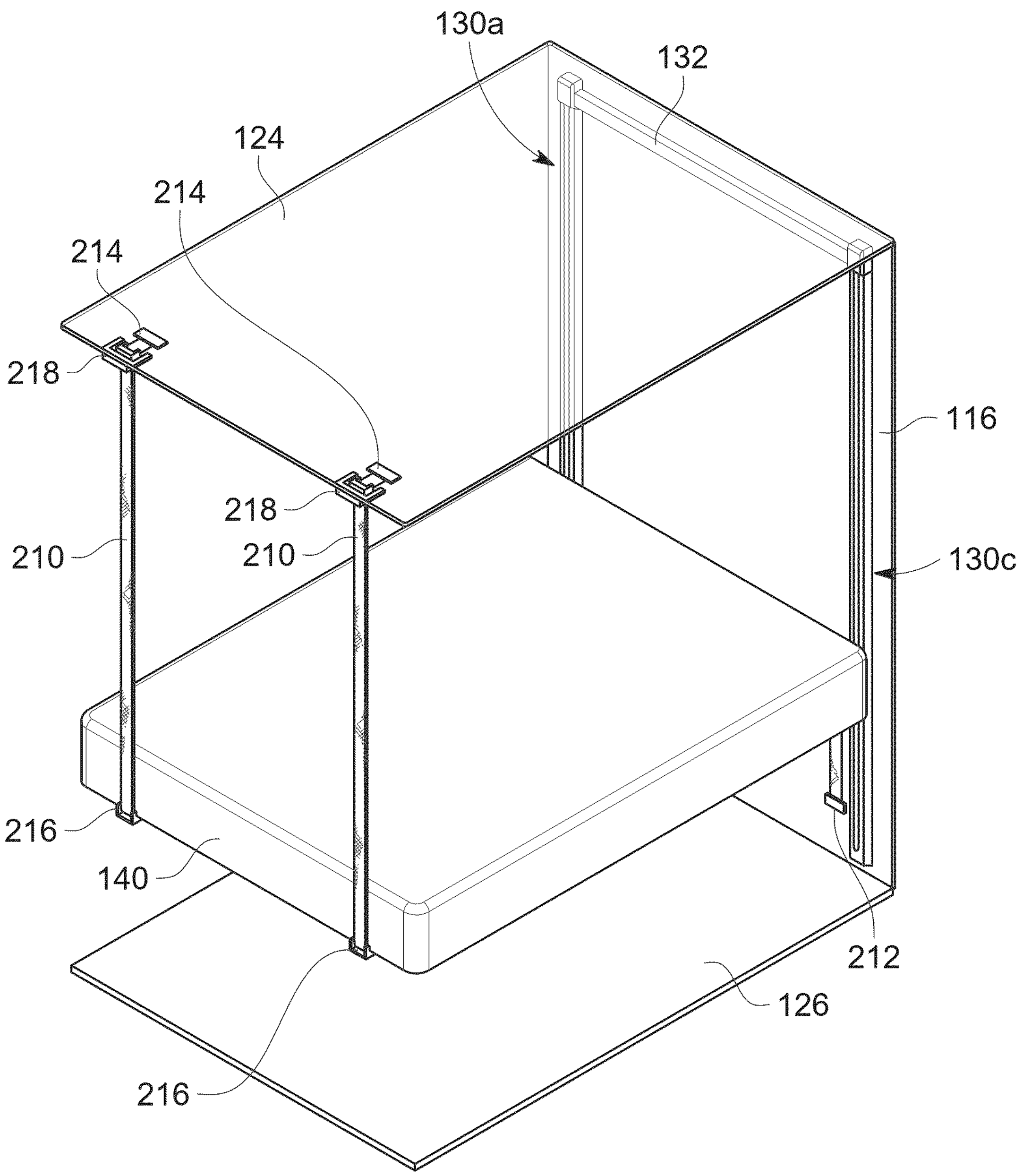
FIGS. 17-18 are perspective views of another embodiment of the lift in FIG. 1 configured to lift a bed with the bed in a lowered position.
Figure 18:
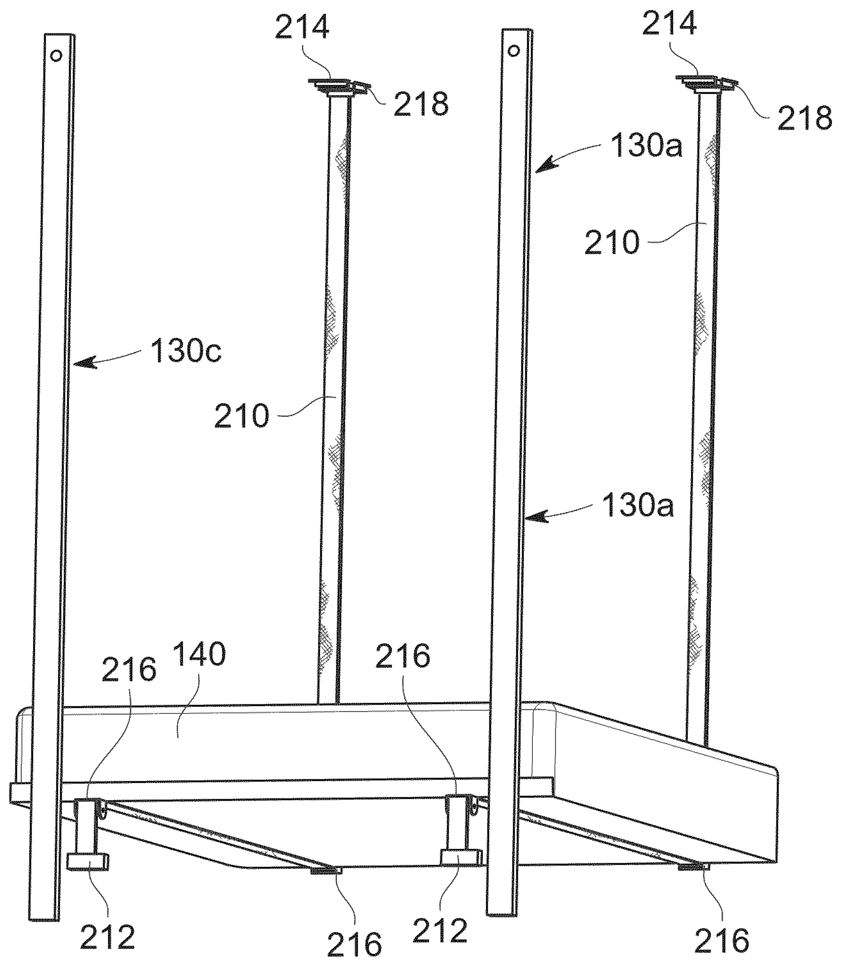
Figure 19:
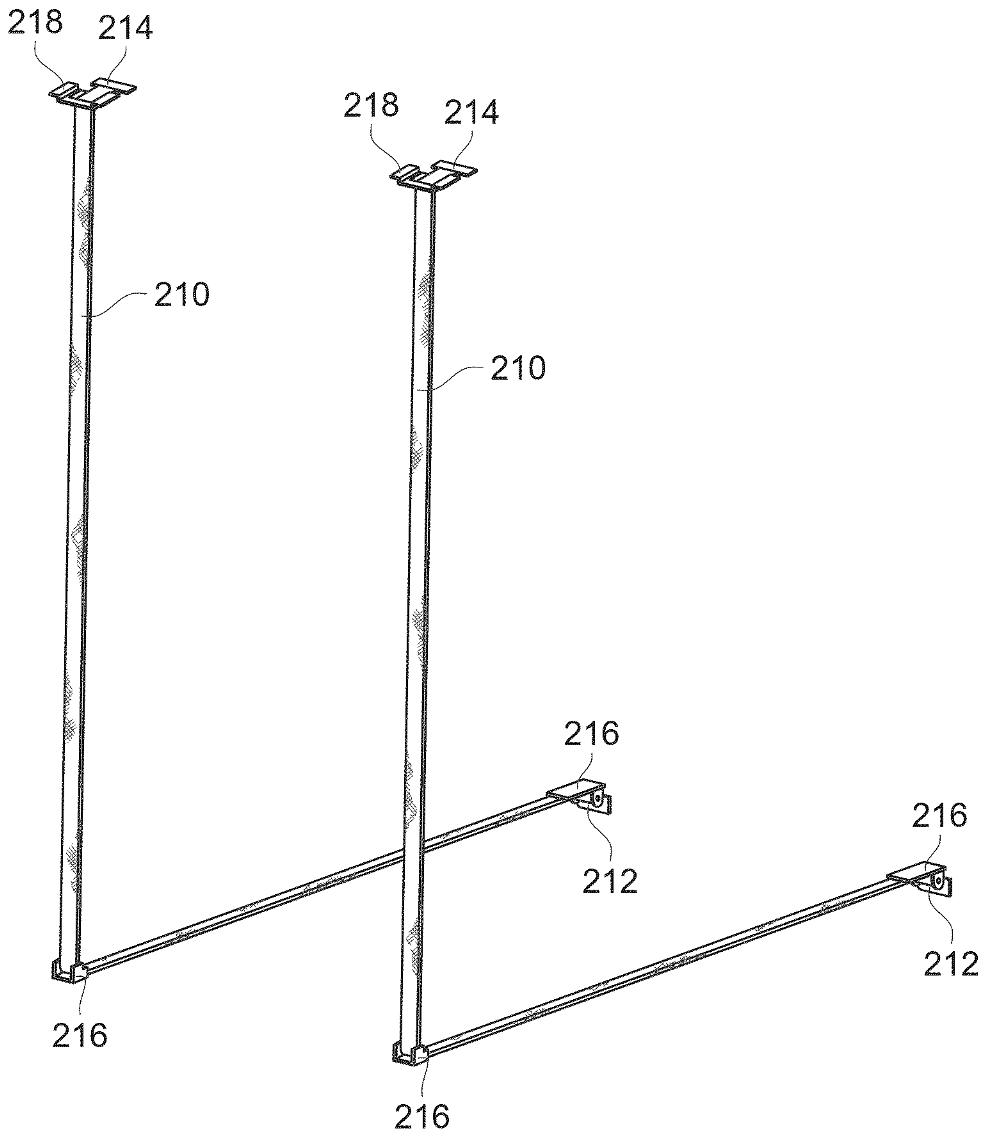
FIG. 19 is a perspective view of one embodiment of a bed support and stabilization system including two flexible support lines configured to extend across the underside of the bed and support the bed in the lowered position.
Figure 20:
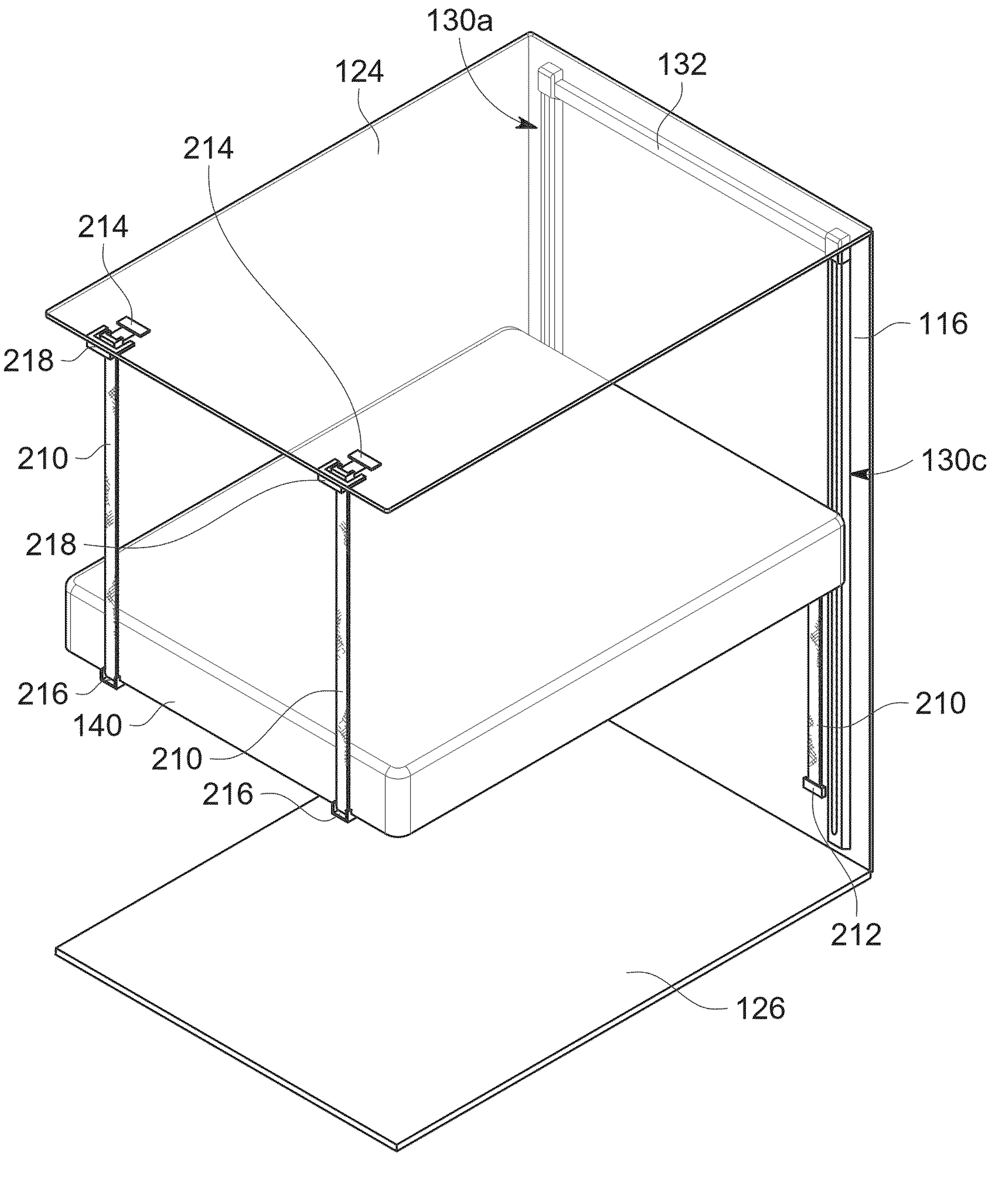
FIG. 20 is a perspective view of the lift in FIGS. 17-18 with the bed in a partially raised or intermediate position.
Figure 21:
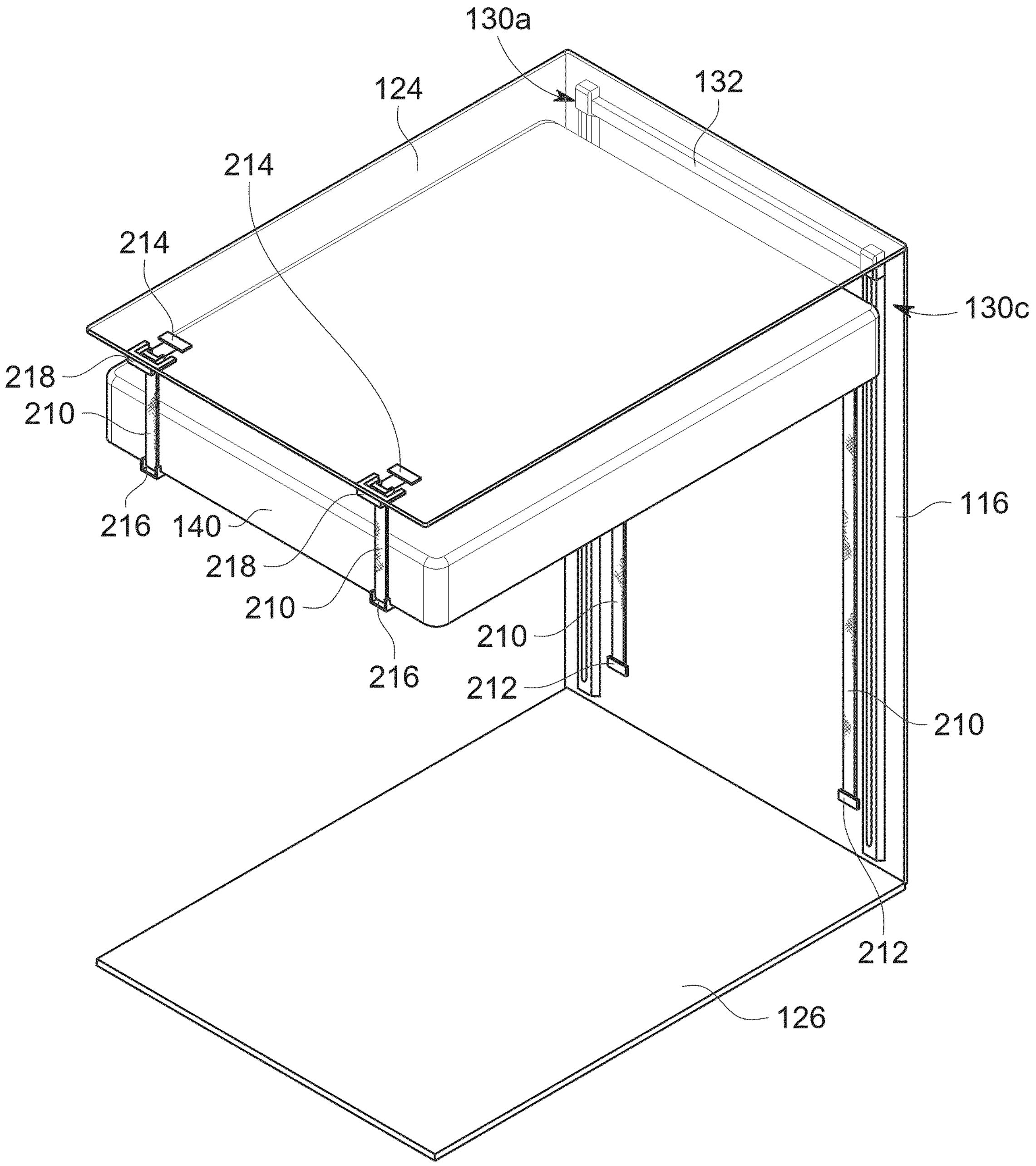
FIGS. 21-22 are perspective views of the lift in FIGS. 17-18 with the bed in a raised position.
Figure 22:
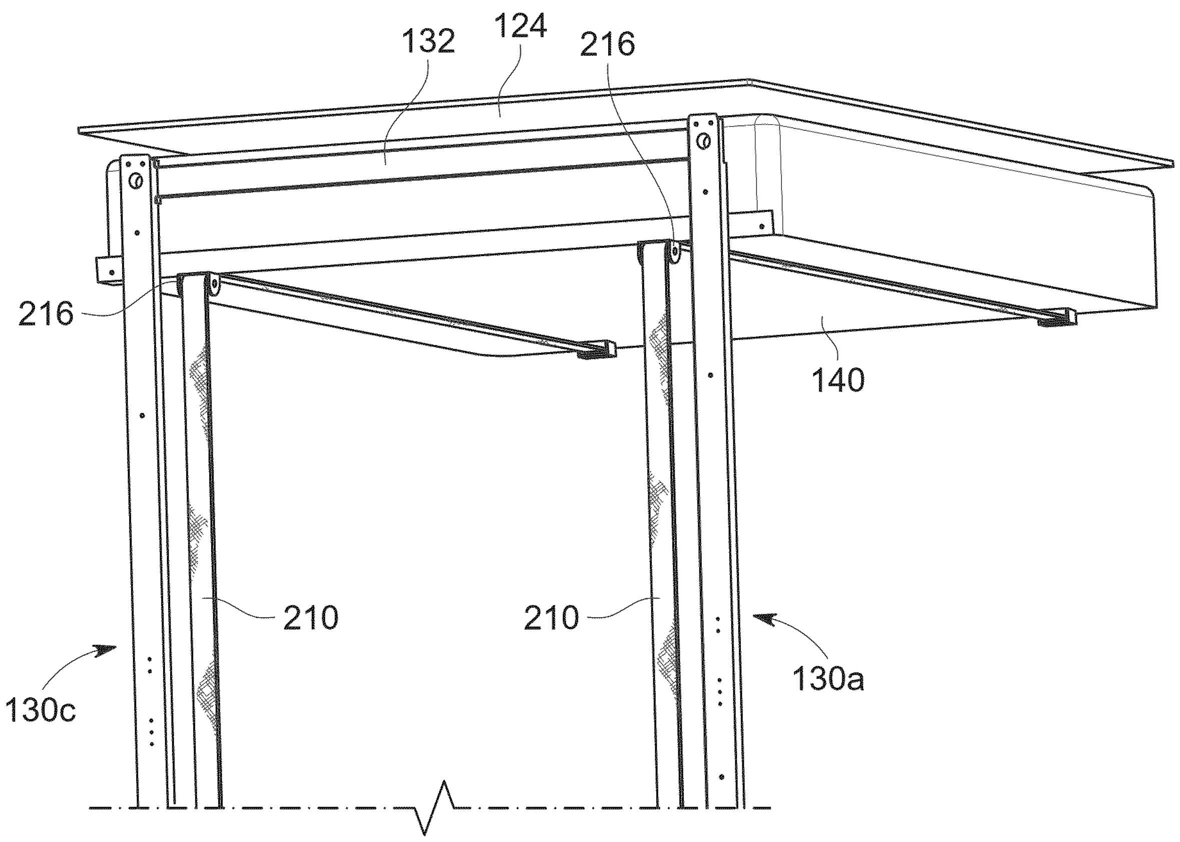
Figure 23:
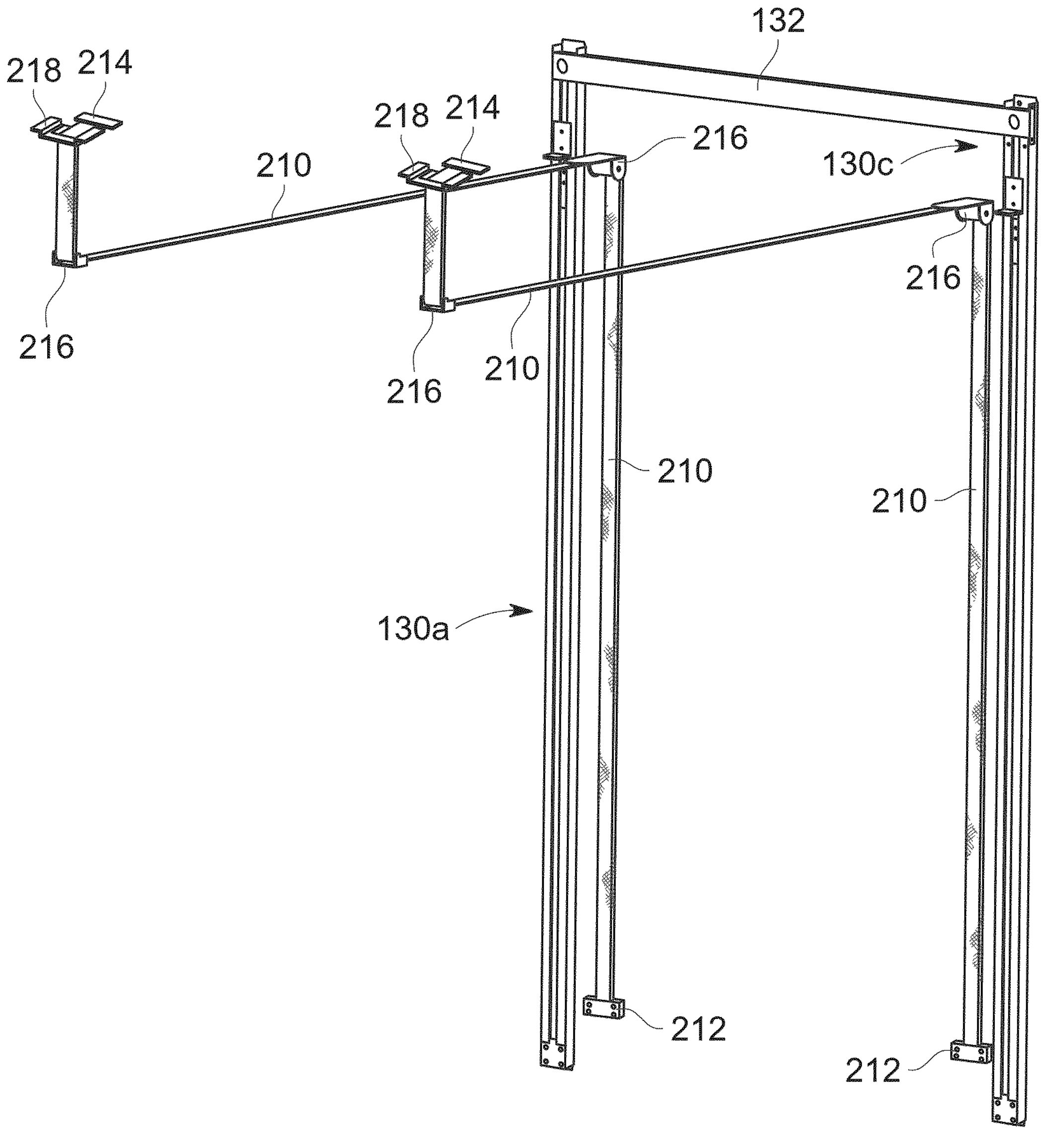
FIG. 23 is a perspective view of the bed support and stabilization system in FIG. 19 with the two flexible support lines configured to extend across the underside of the bed to support the bed in the raised position.
Figure 24:
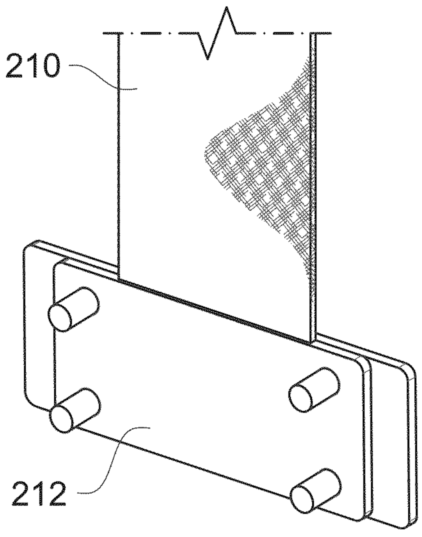
FIG. 24 is a perspective view of one embodiment of a lower anchor point for the flexible support lines in FIG. 19.
Figure 25:
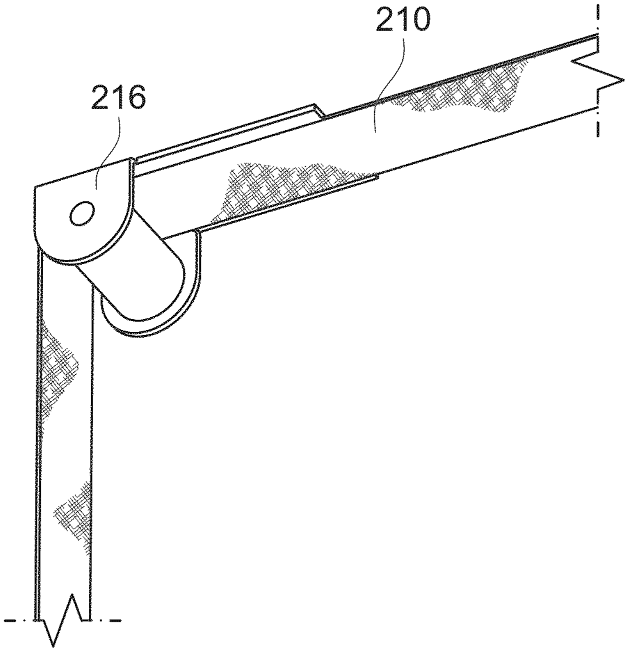
FIG. 25 is a perspective view of one embodiment of a guide for the flexible support lines that can be coupled to one side of the bed.
Figure 26:
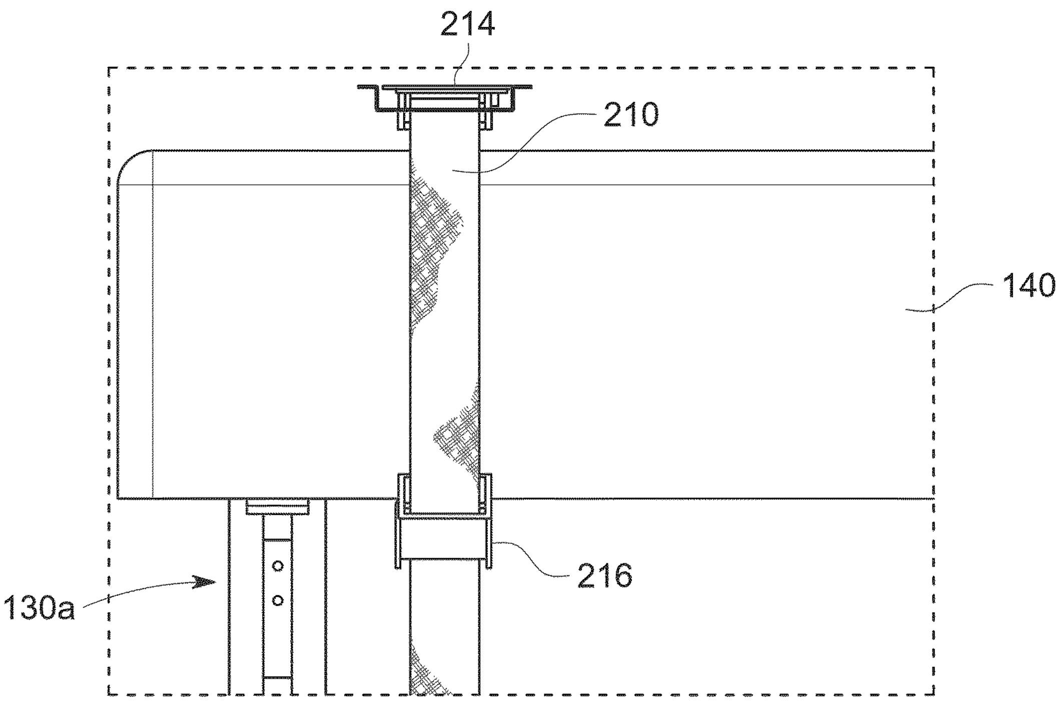
FIG. 26 is a front view of one embodiment of another guide for the flexible support lines that can be coupled to an opposite side of the bed and one embodiment of an upper anchor point for the flexible support lines.
Figure 27:
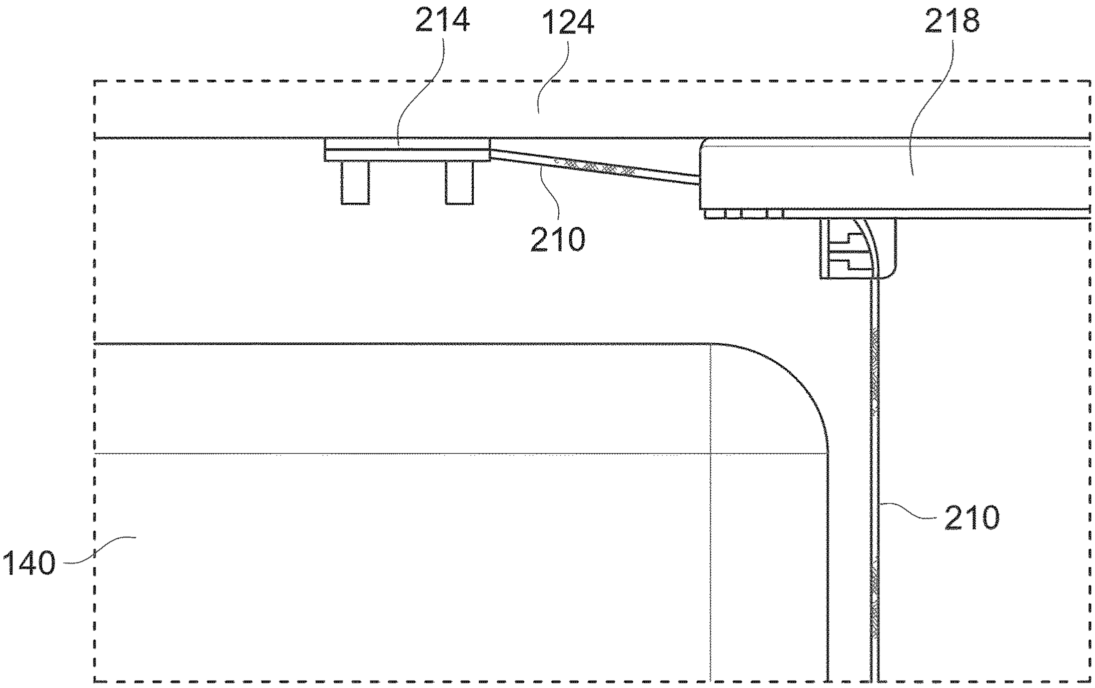
FIG. 27 is a side view of the upper anchor point for the flexible support lines in FIG. 26.
Figure 28:
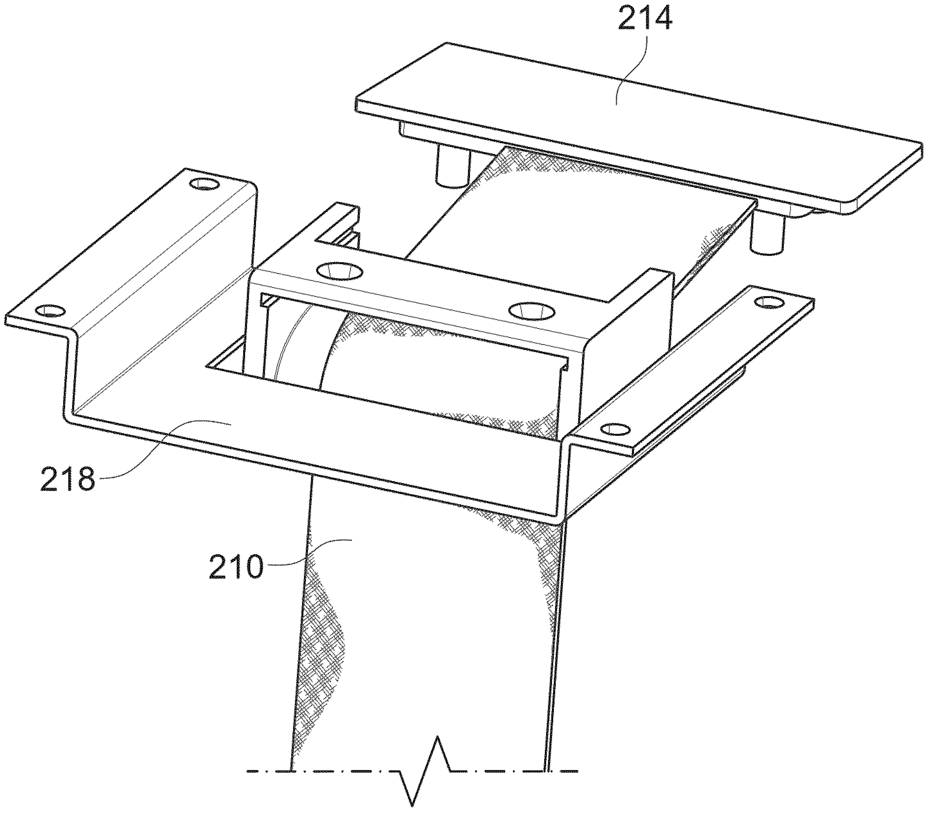
FIG. 28 is a perspective view of the upper anchor point for the flexible support lines in FIG. 26.
Figure 29:
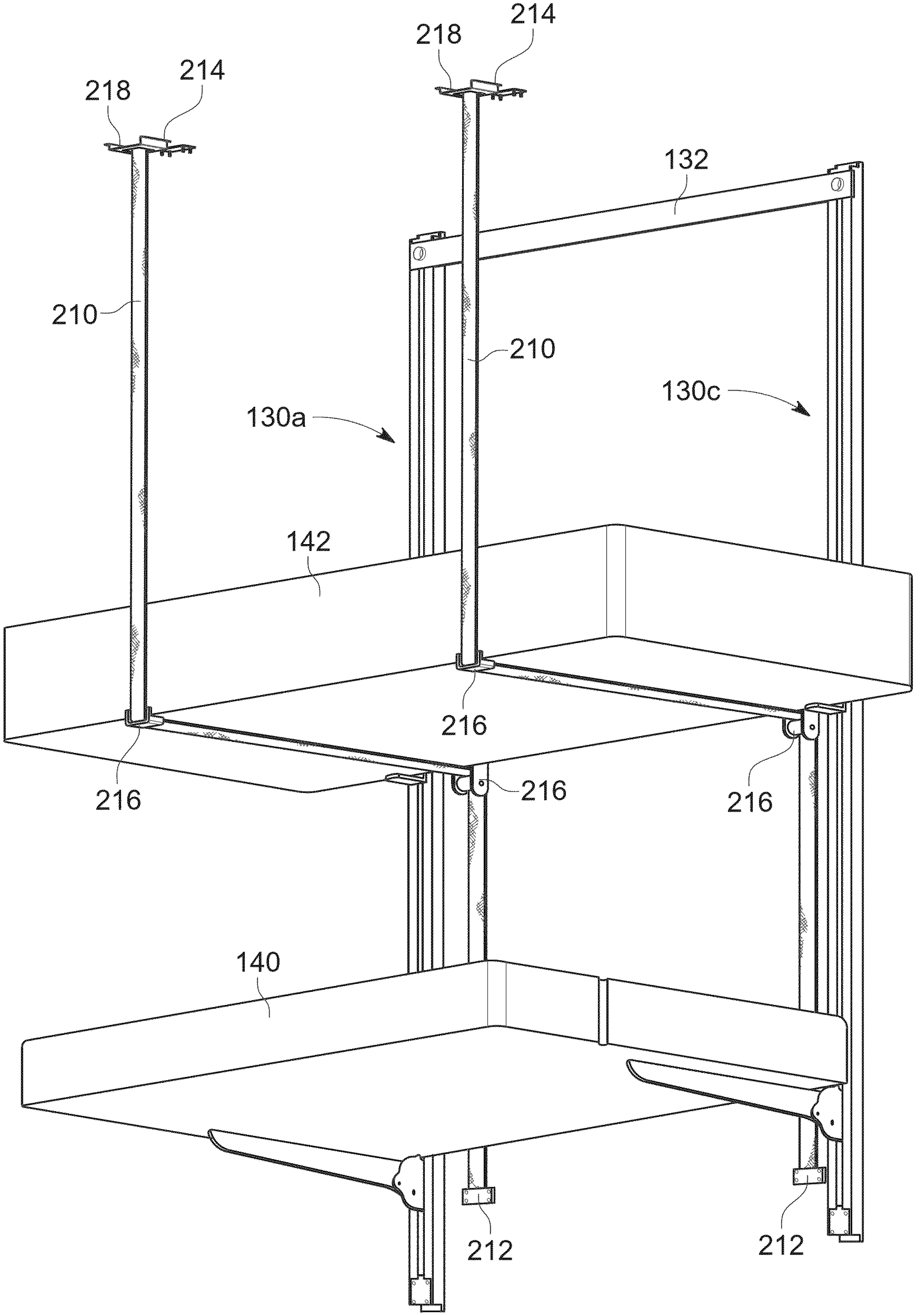
FIGS. 29-30 are perspective views of another embodiment of the lift in FIG. 1 configured to lift an upper bed and a lower bed with the beds being in a double bunk configuration where the lower bed and the upper bed are in a lowered position.
Figure 30:
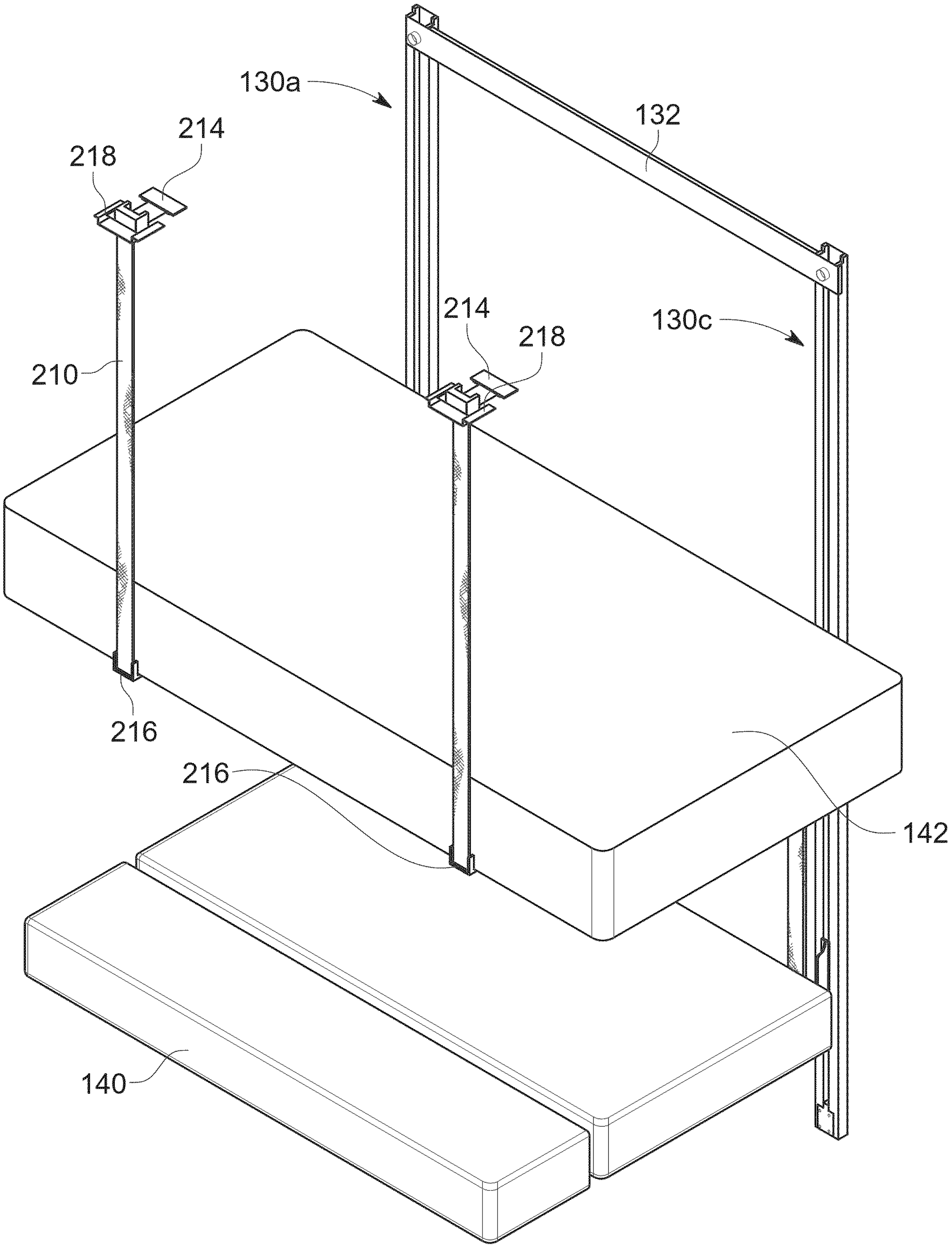
Figure 31:
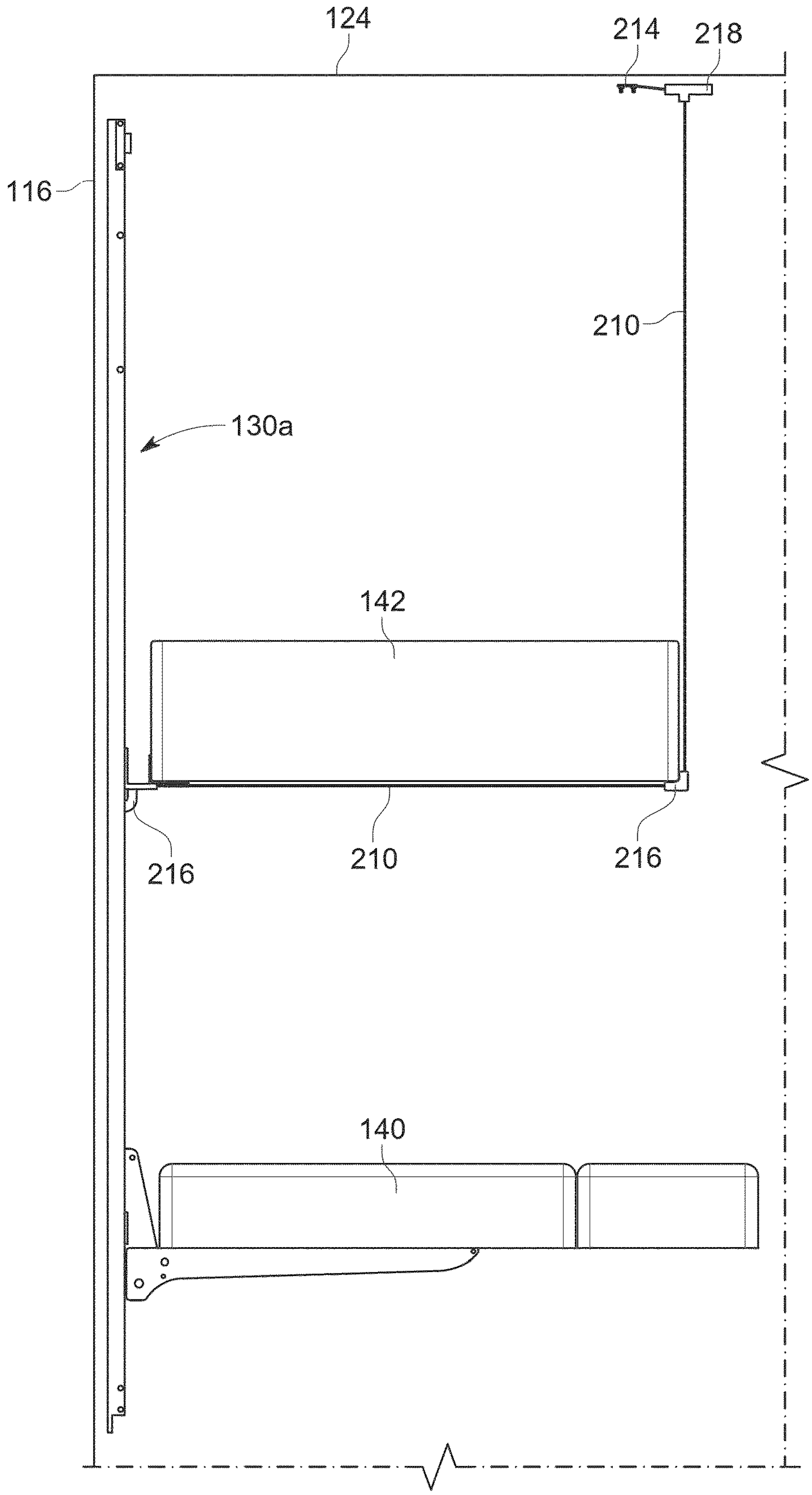
FIG. 31 is a side view of the lift in FIGS. 29-30 in the double bunk configuration.
Figure 32:
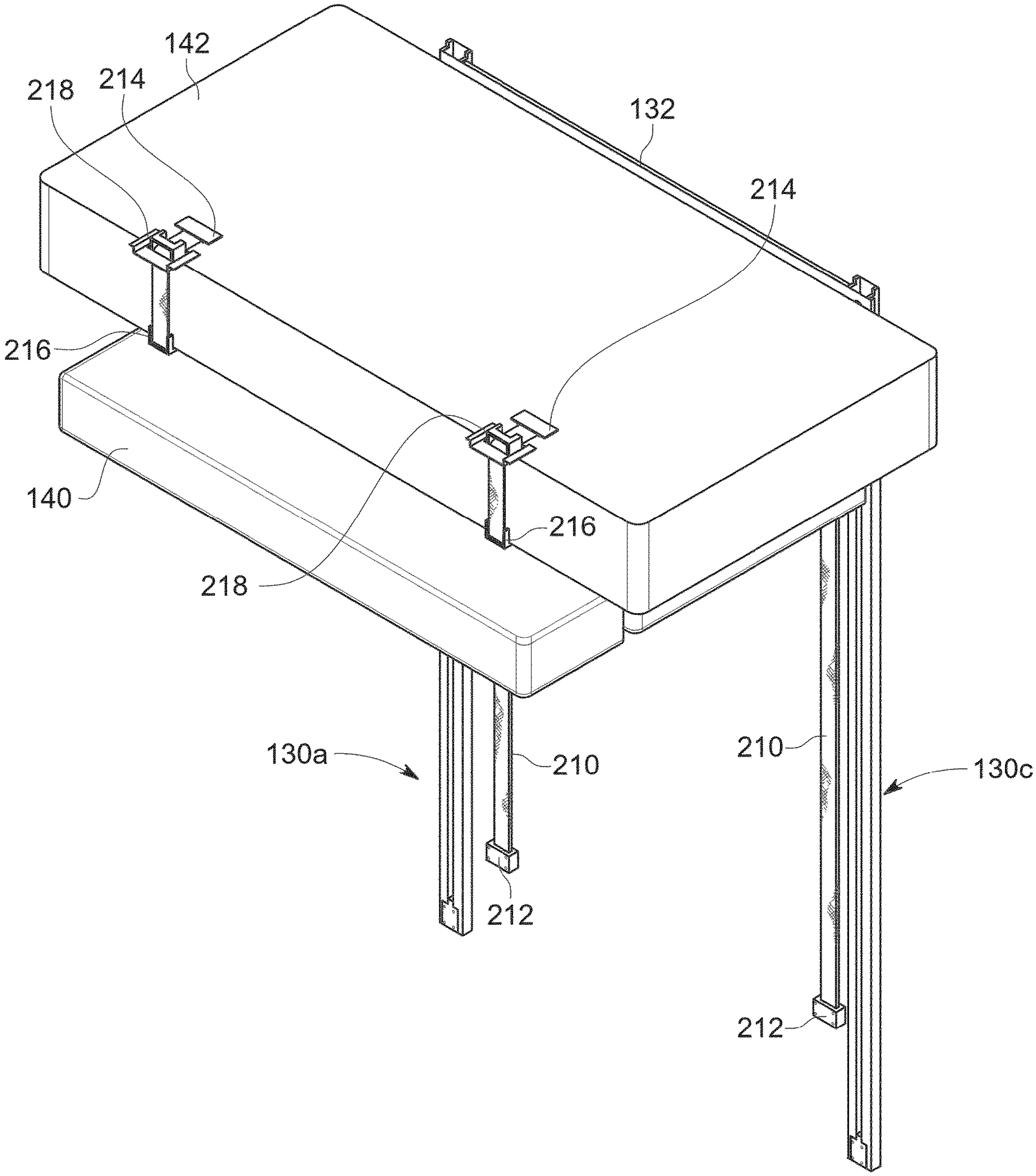
FIG. 32 is a perspective view of the lift in FIGS. 29-30 in a first stowed configuration where the lower bed and the upper bed are in a raised position.
Figure 33:
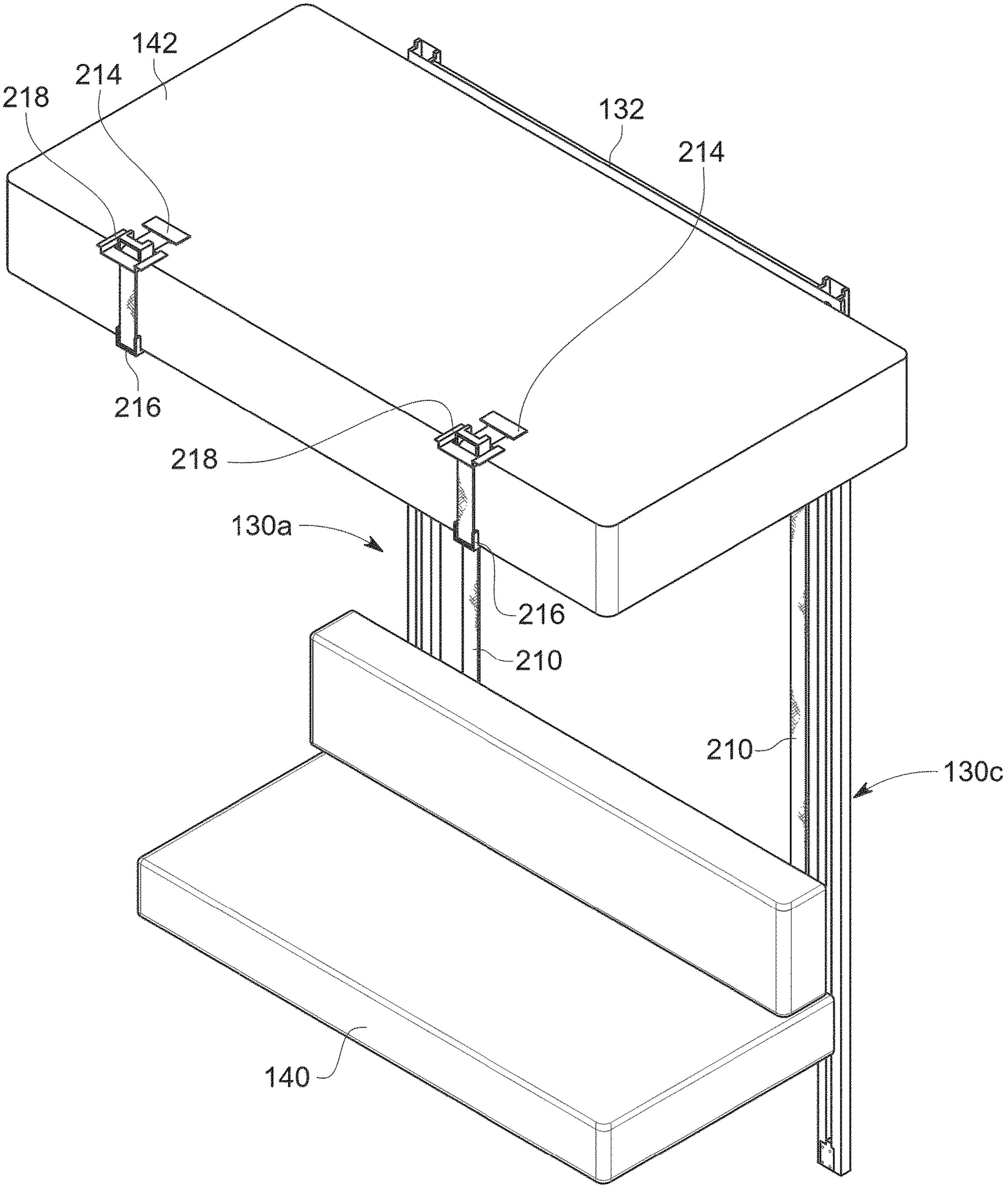
FIGS. 33-34 are perspective views of the lift in FIGS. 29-30 in a seating configuration where the lower bed is in the lowered position and forms a seating unit having a seat base and a seat back and the upper bed is in the raised position.
Figure 34:
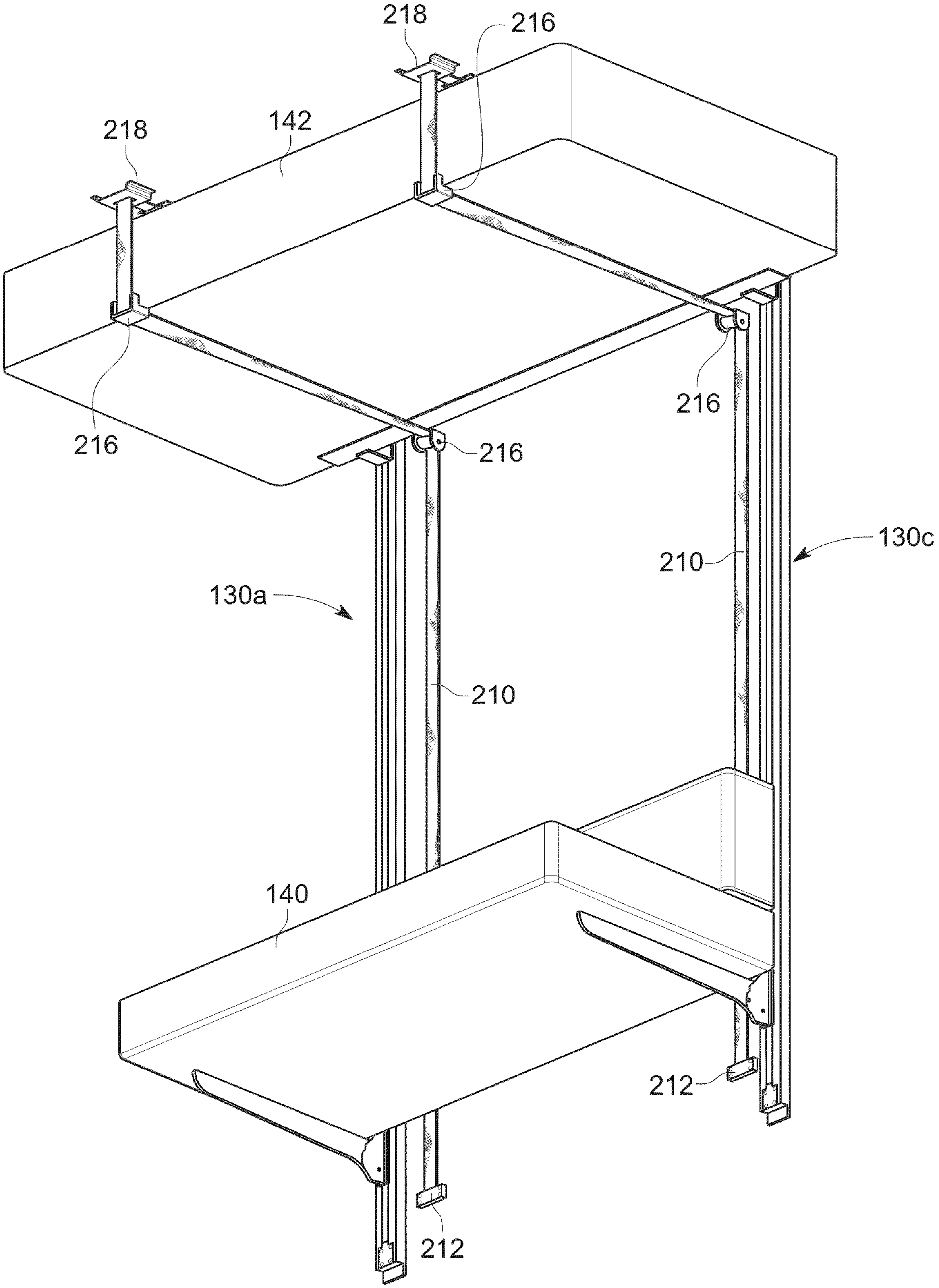
Figure 35:
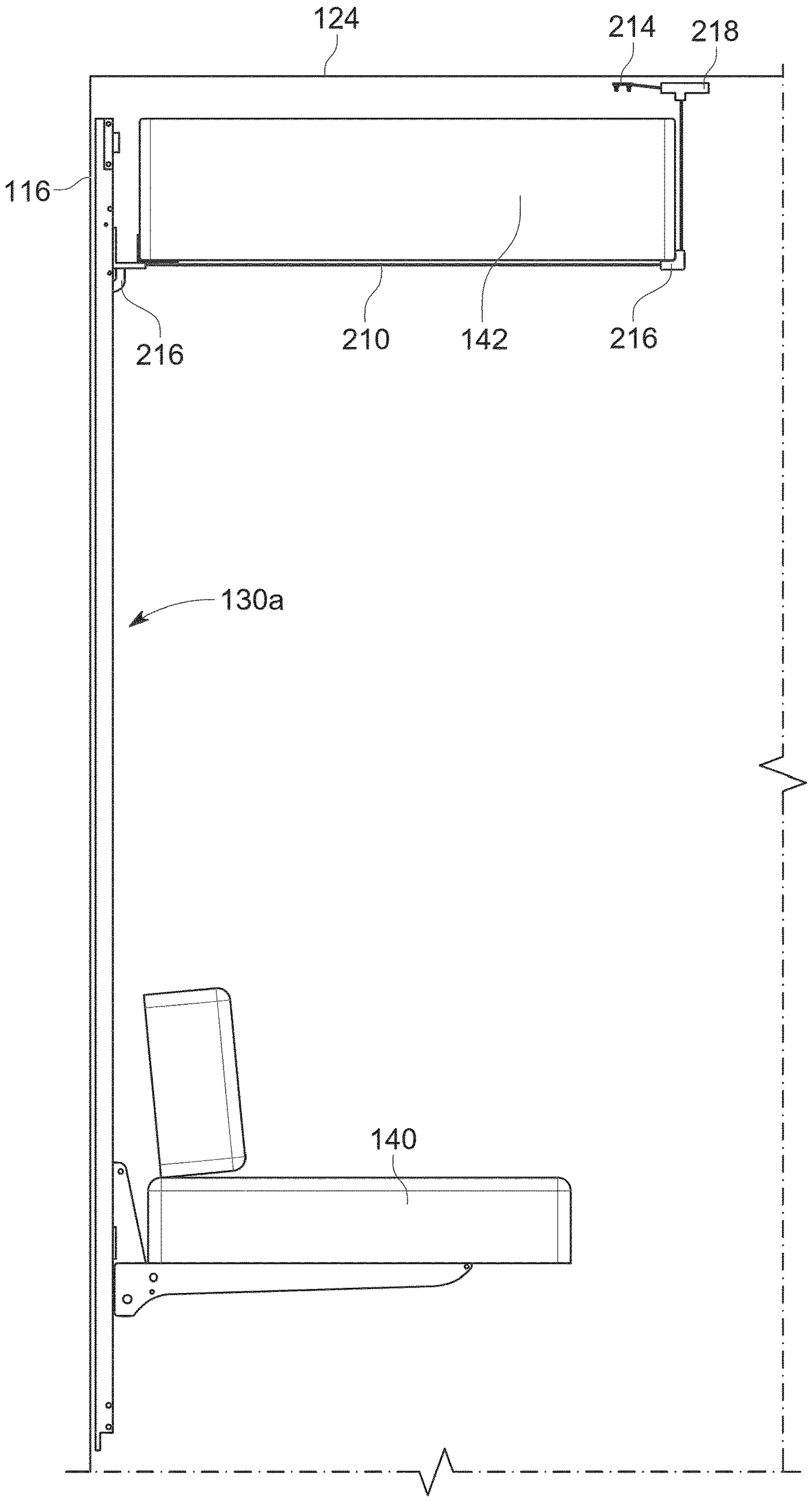
FIG. 35 is a side view of the lift in FIGS. 29-30 in the seating configuration.
Figure 36:
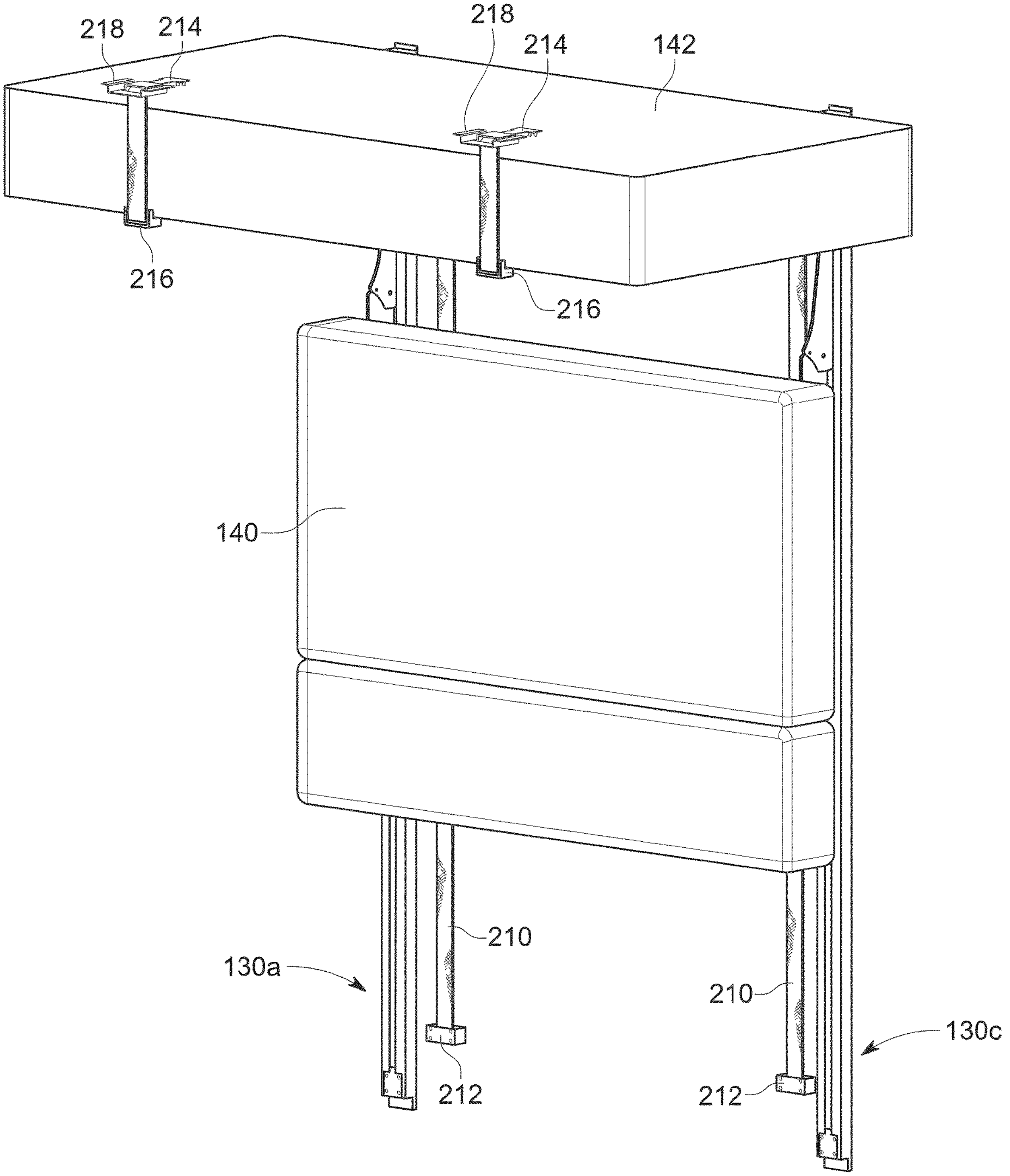
FIGS. 36-37 are perspective views of the lift in FIGS. 29-30 in a second stowed configuration where the lower bed is positioned upright along a wall of the vehicle and the upper bed is in the raised position.
Figure 37:
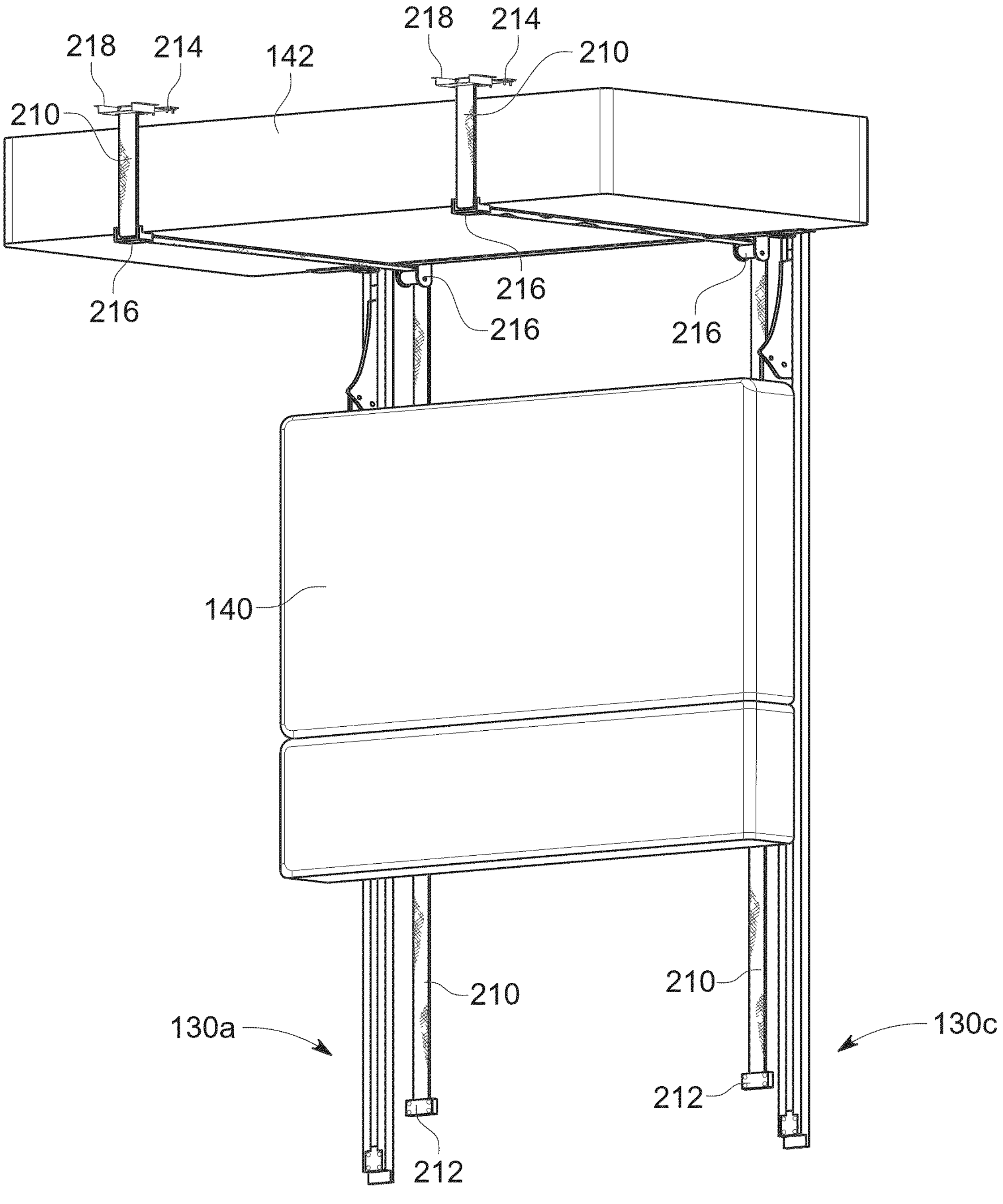
Figure 38:
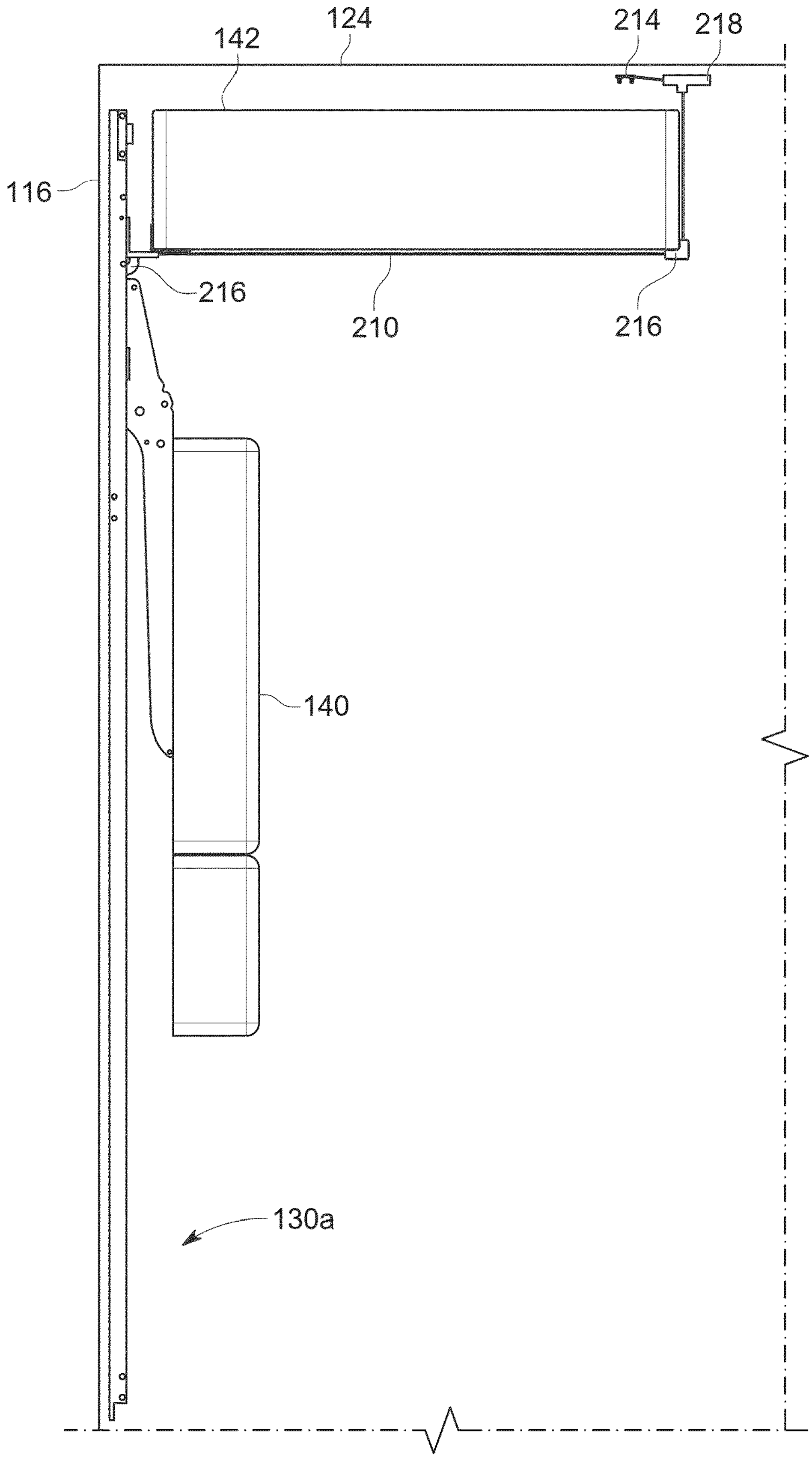
FIG. 38 is a side view of the lift in FIGS. 29-30 in the second stowed configuration.

The lift 112 can move the lower bed 140 between a variety of positions as shown in FIGS. 17-28. For example, the lift 112 can move the lower bed 140 between a lowered position as shown in FIGS. 17-19, an intermediate position as shown in FIG. 20, and a raised position as shown in FIGS. 21-23 and 26-27.

FIGS. 29-38 show another embodiment of the lift 112 that includes the lifting assemblies 130*a*, 130*c* and the bed support and stabilization system having the two flexible support lines 210. In this embodiment, the lift 112 is configured to lift two beds—i.e., the lower bed 140 and the upper bed 142—between the various configurations described above. The flexible support lines 210 support the lower bed 142. The near sides of both the beds 140, 142 are coupled to the lifting assemblies 130*a*, 130*c* and the far sides of the beds 140, 142 are not coupled to any lifting assemblies 130. The lifting assemblies 130*a*, 130*c* can be configured in any of the ways described previously and can be used to move the beds 140, 142 between any of the configurations described previously.

The flexible support lines 210 work in the same manner as described above in connection with FIGS. 17-28. One notable difference is that the upper moving assembly 148 is coupled to and guides movement of the upper bed 142. However, the upper moving assembly 148 is not coupled to the flexible drive member 166. This means that the weight of the upper bed 142 is supported exclusively by the flexible support lines 210 when the upper bed 142 is in the lowered position.

ILLUSTRATIVE EMBODIMENTS

The following is a description of various embodiments of the disclosed subject matter. Each embodiment may include one or more of the various features, characteristics, or advantages of the disclosed subject matter. The embodiments are intended to illustrate a few aspects of the disclosed subject matter and should not be considered a comprehensive or exhaustive description of all possible embodiments.

P1. A vehicle comprising: a guide rail coupled to a wall of the vehicle, the guide rail being oriented vertically in the vehicle; a carriage coupled to the guide rail, the carriage being movable vertically along the guide rail; and a mounting bracket coupled to the carriage; wherein the mounting bracket is vertically movable relative to the carriage.

P2. The vehicle of paragraph P1 wherein the guide rail is a first guide rail, the carriage is a first carriage, and the mounting bracket is a first mounting bracket, the vehicle comprising: a second guide rail coupled to the wall of the vehicle, the second guide rail being oriented vertically in the vehicle; a second carriage coupled to the second guide rail, the second carriage being movable vertically along the second guide rail; and a second mounting bracket coupled to the second carriage; wherein the second mounting bracket is vertically movable relative to the second carriage; and wherein vertical movement of the first carriage and the second carriage is synchronized.

P3. The vehicle of paragraph P1 wherein the guide rail defines a channel, and wherein the carriage is coupled to the guide rail by being positioned in the channel.

P4. The vehicle of paragraph P1 wherein the mounting bracket or the carriage comprises a slot extending vertically, and wherein the mounting bracket is vertically movable relative to the carriage along the slot.

P5. The vehicle of paragraph P1 wherein the mounting bracket includes a slot structured to receive a fastener attached to the carriage, and wherein the mounting bracket is vertically movable relative to the carriage along the slot.

P6. The vehicle of paragraph P5 wherein the fastener includes a shoulder bolt.

P7. The vehicle of paragraph P1 wherein the mounting bracket is coupled to a bed.

P8. A lift comprising: a guide rail having a lengthwise direction, the guide rail being structured to be coupled to a structure in a vertical orientation; a carriage coupled to the guide rail, the carriage being movable along the guide rail in the lengthwise direction; and a mounting bracket coupled to the carriage; wherein the mounting bracket is movable relative to the carriage in the lengthwise direction.

P9. The lift of paragraph P8 wherein the mounting bracket or the carriage comprises a slot extending in the lengthwise direction of the guide rail, and wherein the mounting bracket is movable along the slot in the lengthwise direction.

P10. The lift of paragraph P9 wherein the mounting bracket includes the slot.

P11. The lift of paragraph P9 wherein the carriage includes the slot.

P12. The lift of paragraph P8 wherein the mounting bracket is coupled to the carriage with a fastener extending through a slot, and wherein the mounting bracket is movable along the slot in the lengthwise direction.

P13. The lift of paragraph P8 wherein the mounting bracket includes a slot structured to receive a fastener attached to the carriage, and wherein the mounting bracket is movable along the slot in the lengthwise direction.

P14. The lift of paragraph P13 wherein the fastener includes a shoulder bolt.

P15. A bed lift comprising: a guide rail having a lengthwise direction, the guide rail being structured to be coupled inside a vehicle in a vertical orientation; a carriage coupled to the guide rail, the carriage being movable along the guide rail in the lengthwise direction; and a mounting bracket coupled to the carriage, the mounting bracket being structured to be coupled to a bed; wherein the mounting bracket is movable relative to the carriage in the lengthwise direction.

P16. The bed lift of paragraph P15 wherein the mounting bracket or the carriage comprises a slot extending in the lengthwise direction of the guide rail, and wherein the mounting bracket is movable along the slot in the lengthwise direction.

P17. The bed lift of paragraph P16 wherein the mounting bracket includes the slot.

P18. The bed lift of paragraph P16 wherein the carriage includes the slot.

P19. The bed lift of paragraph P15 wherein the mounting bracket is coupled to the carriage with fasteners extending through a slot, and wherein the mounting bracket is movable along the slot in the lengthwise direction.

P20. The bed lift of paragraph P15 wherein the mounting bracket includes a slot structured to receive fasteners attached to the carriage, and wherein the mounting bracket is movable along the slot in the lengthwise direction.

P21. A vehicle comprising: a guide rail coupled to a wall of the vehicle, the guide rail being oriented vertically in the vehicle; a carriage coupled to the guide rail, the carriage being movable vertically along the guide rail; an electric motor coupled to the guide rail at the top of the guide rail, the electric motor being configured to power movement of the carriage along the guide rail; a vehicle accessory vertically movable between a lowered position where the vehicle accessory is positioned to be used and a raised position where the vehicle accessory is stowed; and a mounting bracket coupling the vehicle accessory to the carriage, the mounting bracket including a mounting surface to which the vehicle accessory is fastened; wherein the mounting surface is offset horizontally relative to the carriage to allow a side of the vehicle accessory to pass by a side of the electric motor when the vehicle accessory is in the raised position.

P22. The vehicle of paragraph P21 wherein the guide rail is a first guide rail, the carriage is a first carriage, and the mounting bracket is a first mounting bracket, the vehicle comprising: a second guide rail coupled to the wall of the vehicle, the second guide rail being oriented vertically in the vehicle; a second carriage coupled to the second guide rail, the second carriage being movable vertically along the second guide rail; and a second mounting bracket coupling the vehicle accessory to the second carriage; wherein the electric motor powers vertical movement of the first carriage and the second carriage; and wherein the mounting surface of the first mounting bracket is horizontally offset towards the second guide rail.

P23. The vehicle of paragraph P21 wherein the vehicle is a recreational vehicle.

P24. The vehicle of paragraph P21 wherein the vehicle accessory includes a cooktop.

P25. The vehicle of paragraph P21 wherein the vehicle accessory includes a countertop.

P26. The vehicle of paragraph P21 wherein the vehicle is a cargo trailer.

P27. The vehicle of paragraph P21 wherein the vehicle accessory includes a bed.

P28. A lift comprising: a guide rail having a lengthwise direction, the guide rail being structured to be coupled to a vehicle in a vertical orientation; a carriage coupled to the guide rail, the carriage being movable along the guide rail in the lengthwise direction; an electric motor coupled to the guide rail at the top of the guide rail, the electric motor being configured to power movement of the carriage along the guide rail; a mounting bracket structured to couple a vehicle accessory to the carriage; the mounting bracket including a mounting surface to which the vehicle accessory can be fastened; wherein the mounting surface is offset relative to the carriage and the electric motor.

P29. The lift of paragraph P28 wherein the guide rail is a first guide rail, the carriage is a first carriage, and the mounting bracket is a first mounting bracket, the lift comprising: a second guide rail having a lengthwise direction, the second guide rail being structured to be coupled to the vehicle in a vertical orientation; a second carriage coupled to the second guide rail, the second carriage being movable along the second guide rail in the lengthwise direction; and a second mounting bracket structured to couple the vehicle accessory to the second carriage; wherein the electric motor powers vertical movement of the first carriage and the second carriage; and wherein the mounting surface of the first mounting bracket is horizontally offset towards the second guide rail.

P30. The lift of paragraph P28 wherein the vehicle is a recreational vehicle.

P31. The lift of paragraph P28 wherein the vehicle accessory includes a cooktop.

P32. The lift of paragraph P28 wherein the vehicle accessory includes a countertop.

P33. The lift of paragraph P28 wherein the mounting bracket is coupled to the carriage with tabs received by corresponding slots.

P34. The lift of paragraph P33 wherein the mounting bracket includes the tabs and the carriage includes the corresponding slots.

P35. A bed lift comprising: a guide rail having a lengthwise direction, the guide rail being structured to be coupled inside a vehicle in a vertical orientation; a carriage coupled to the guide rail, the carriage being movable along the guide rail in the lengthwise direction; an electric motor coupled to the guide rail at the top of the guide rail, the electric motor being configured to power movement of the carriage along the guide rail; a mounting bracket structured to couple a bed to the carriage; the mounting bracket including a mounting surface to which the bed can be fastened; wherein the mounting surface is offset relative to the carriage and the electric motor.

P36. The bed lift of paragraph P35 wherein the guide rail is a first guide rail, the carriage is a first carriage, and the mounting bracket is a first mounting bracket, the bed lift comprising: a second guide rail having a lengthwise direction, the second guide rail being structured to be coupled to the vehicle in a vertical orientation; a second carriage coupled to the second guide rail, the second carriage being movable along the second guide rail in the lengthwise direction; and a second mounting bracket structured to couple the bed to the second carriage; wherein the electric motor powers vertical movement of the first carriage and the second carriage; and wherein the mounting surface of the first mounting bracket is horizontally offset towards the second guide rail.

P37. The bed lift of paragraph P35 wherein the vehicle is a recreational vehicle.

P38. The bed lift of paragraph P35 wherein the vehicle is a cargo trailer.

P39. The bed lift of paragraph P35 wherein the mounting bracket is coupled to the carriage with tabs received by corresponding slots.

P40. The bed lift of paragraph P39 wherein the mounting bracket includes the tabs and the carriage includes the corresponding slots.

P41. A vehicle comprising: a guide rail coupled to a wall of the vehicle, the guide rail being oriented vertically in the vehicle; a bed including a near side coupled to the guide rail and a far side positioned opposite the near side, the bed being vertically movable between a lowered position where the bed is positioned to be used and a raised position where the bed is stowed; and a flexible support line extending upward from a lower anchor point to one side of the bed, across the bed to an opposite side of the bed, and upward from the opposite side of the bed to an upper anchor point; wherein the flexible support line is structured to slide across the bed and hold the bed in an at least approximately horizontal orientation as the bed moves between the lowered position and the raised position; and wherein the far side of the bed is not coupled to a guide rail.

P42. The vehicle of paragraph P41 wherein the guide rail is a first guide rail, the flexible support line is a first flexible support line, the lower anchor point is a first lower anchor point, and the upper anchor point is a first upper anchor point, the vehicle comprising: a second guide rail coupled to the wall of the vehicle, the second guide rail being oriented vertically in the vehicle and coupled to the bed; and a second flexible support line extending upward from a second lower anchor point to the one side of the bed, across the bed to the opposite side of the bed, and upward from the opposite side of the bed to a second upper anchor point; wherein the second flexible support line is structured to slide across the bed and hold the bed in an at least approximately horizontal orientation as the bed moves between the lowered position and the raised position.

P43. The vehicle of paragraph P41 wherein the one side of the bed is the near side of the bed and the opposite side of the bed is the far side of the bed.

P44. The vehicle of paragraph P41 wherein the upper anchor point is on a ceiling of the vehicle.

P45. The vehicle of paragraph P41 wherein the lower anchor point is on the wall of the vehicle.

P46. The vehicle of paragraph P41 wherein the flexible support line is structured to slide underneath or through the bed.

P47. The vehicle of paragraph P41 wherein the far side of the bed is supported by only the flexible support line.

P48. The vehicle of paragraph P41 wherein the flexible support line includes a fabric strap or cable.

P49. A bed lift comprising: a guide rail structured to be coupled inside a vehicle in a vertical orientation, the guide rail also being structured to be coupled to a bed in the vehicle movable between a lowered position and a raised position and having a near side and a far side, the guide rail being structured to be coupled to the near side of the bed; and at least one flexible support line structured to extend upward from a lower anchor point in the vehicle to one side of the bed, across the bed to an opposite side of the bed, and upward from the opposite side of the bed to an upper anchor point in the vehicle; wherein the at least one flexible support line is structured to slide across the bed and hold the bed in an at least approximately horizontal orientation as the bed moves between the lowered position and the raised position; and wherein the at least one flexible support line is structured to be the only support the far side of the bed in the vehicle.

P50. The bed lift of paragraph P49 wherein the guide rail is a first guide rail, the bed lift comprising: a second guide rail structured to be coupled inside the vehicle in a vertical orientation, the second guide rail also being structured to be coupled to the near side of the bed in the vehicle; at least two flexible support lines each of which is structured to extend upward from a lower anchor point in the vehicle to the one side of the bed, across the bed to the opposite side of the bed, and upward from the opposite side of the bed to an upper anchor point in the vehicle; wherein the at least two flexible support lines are each structured to slide across the bed and hold the bed in an at least approximately horizontal orientation as the bed moves between the lowered position and the raised position; wherein the at least two flexible support lines are structured to be the only support for the far side of the bed in the vehicle.

P51. The bed lift of paragraph P49 wherein the one side of the bed is the near side of the bed and the opposite side of the bed is the far side of the bed.

P52. The bed lift of paragraph P49 wherein the upper anchor point is on a ceiling of the vehicle.

P53. The bed lift of paragraph P49 wherein the lower anchor point is on a wall of the vehicle.

P54. The bed lift of paragraph P49 wherein the at least one flexible support line is structured to slide underneath or through the bed.

P55. The bed lift of paragraph P49 wherein the at least one flexible support line includes a fabric strap or cable.

P56. A vehicle comprising: a lower bed; an upper bed positioned above the lower bed, the lower bed and the upper bed being movable between a lowered position where the lower bed and the upper bed are spaced apart and a raised position where the lower bed and the upper bed are stowed; and a flexible support line extending upward from a lower anchor point to one side of the upper bed, across the upper bed to an opposite side of the upper bed, and upward from the opposite side of the upper bed to an upper anchor point; wherein the flexible support line is structured to slide across the upper bed and hold the upper bed in an at least approximately horizontal orientation as the upper bed moves between the lowered position and the raised position.

P57. The vehicle of paragraph P56 wherein the lower bed and the upper bed are movable between a double bunk configuration where the lower bed and the upper bed are in the lowered position, a single bunk configuration where the lower bed is in the lowered position and the upper bed is in the raised position, and a stowed configuration where the lower bed and the upper bed are in the raised position.

P58. The vehicle of paragraph P57 wherein the lower bed and the upper bed are movable between the double bunk configuration, the single bunk configuration, the stowed configuration, and a seating configuration where the lower bed is in the lowered position and forms a seating unit with a seat base and a seat back and the upper bed is in the raised position.

P59. The vehicle of paragraph P57 wherein the stowed configuration is a first stowed configuration and wherein the lower bed and the upper bed are movable between the double bunk configuration, the single bunk configuration, the first stowed configuration, and a second stowed configuration where the lower bed is stowed in an upright position and the upper bed is in the raised position.

P60. A bed lift comprising: a guide rail structured to be coupled inside a vehicle in a vertical orientation, the guide rail also being structured to be coupled to a lower bed and an upper bed in the vehicle that are movable between a lowered position where the lower bed and the upper bed are spaced apart and a raised position where the lower bed and the upper bed are stowed; and a flexible support line structured to extend upward from a lower anchor point in the vehicle to one side of the upper bed, across the upper bed to an opposite side of the upper bed, and upward from the opposite side of the upper bed to an upper anchor point in the vehicle; wherein the flexible support line is structured to slide across the upper bed and hold the upper bed in an at least approximately horizontal orientation as the upper bed moves between the lowered position and the raised position.

P61. The bed lift of paragraph P60 wherein the guide rail is a first guide rail, the flexible support line is a first flexible support line, the lower anchor point is a first lower anchor point, and the upper anchor point is a first upper anchor point, the bed lift comprising: a second guide rail structured to be coupled inside the vehicle in a vertical orientation, the second guide rail being structured to be coupled to the lower bed and the upper bed in the vehicle; and a second flexible support line structured to extend upward from a second lower anchor point in the vehicle to the one side of the upper bed, across the upper bed to the opposite side of the upper bed, and upward from the opposite side of the upper bed to a second upper anchor point in the vehicle; wherein the second flexible support line is structured to slide across the upper bed and hold the upper bed in the at least approximately horizontal orientation as the upper bed moves between the lowered position and the raised position.

P62. The bed lift of paragraph P60 wherein the guide rail is structured to be coupled to the one side of the upper bed.

P63. The bed lift of paragraph P60 wherein the upper anchor point is on a ceiling of the vehicle.

P64. The bed lift of paragraph P60 wherein the lower anchor point is on a wall of the vehicle.

P65. The bed lift of paragraph P60 wherein the flexible support line is structured to slide underneath or through the upper bed.

P66. The bed lift of paragraph P60 wherein the flexible support line includes a fabric strap or cable.

P67. A vehicle comprising: a guide rail coupled to a wall of the vehicle, the guide rail being oriented vertically in the vehicle; a bed including a near side coupled to the guide rail and a far side positioned opposite the near side, the bed being vertically movable between a lowered position where the bed is positioned to be used and a raised position where the bed is stowed; and a flexible support line extending upward from a lower anchor point to one side of the bed, across the bed to an opposite side of the bed, and upward from the opposite side of the bed to an upper anchor point; wherein the flexible support line is structured to slide across the bed and hold the bed in an at least approximately horizontal orientation as the bed moves between the lowered position and the raised position; and wherein at least one of the lower anchor point and/or the upper anchor point is on the vehicle and not on a guide rail.

General Terminology and Interpretative Conventions

Any methods described in the claims or specification should not be interpreted to require the steps to be performed in a specific order unless expressly stated otherwise or doing so is impossible. Also, the methods should be interpreted to provide support to perform the recited steps in any order unless expressly stated otherwise.

Certain features described in the context of separate embodiments can also be implemented in combination in a single embodiment. Conversely, various features described in the context of a single embodiment can also be implemented in multiple embodiments separately or in any suitable subcombination. Moreover, although features may be described in certain combinations and even initially claimed as such, one or more features from a claimed combination can be excised from the combination, and the claimed combination may be directed to a subcombination or variation of a subcombination.

The example configurations described in this document do not represent all the examples that may be implemented or that are within the scope of the claims. The term “example” shall be interpreted to mean “serving as an example, instance, or illustration,” and not “preferred” or “advantageous over other examples.”

Articles such as “the,” “a,” and “an” can connote the singular or plural. Also, the word “or” when used without a preceding “either” (or other similar language indicating that “or” is unequivocally meant to be exclusive—e.g., only one of x or y, etc.) shall be interpreted to be inclusive (e.g., “x or y” means one or both x or y).

The term “and/or” shall also be interpreted to be inclusive (e.g., “x and/or y” means one or both x or y). In situations where “and/or” or “or” are used as a conjunction for a group of three or more items, the group should be interpreted to include one item alone, all the items together, or any combination or number of the items.

The phrase “based on” shall be interpreted to refer to an open set of conditions unless unequivocally stated otherwise (e.g., based on only a given condition). For example, a step described as being based on a given condition may be based on the recited condition and one or more unrecited conditions.

The terms have, having, contain, containing, include, including, and characterized by should be interpreted to be synonymous with the terms comprise and comprising—i.e., the terms are inclusive or open-ended and do not exclude additional unrecited subject matter. The use of these terms should also be understood as disclosing and providing support for narrower alternative embodiments where these terms are replaced by "consisting of," "consisting of the recited subject matter plus impurities and/or trace amounts of other materials," or "consisting essentially of."

Unless otherwise indicated, all numbers or expressions, such as those expressing dimensions, physical characteristics, or the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and/or by applying ordinary rounding techniques.

All disclosed ranges are to be understood to encompass and provide support for claims that recite any subranges or any individual values subsumed by each range. For example, a stated range of 1 to 10 should be considered to include and provide support for claims that recite any subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

None of the limitations in the claims should be interpreted as invoking 35 U.S.C. 112(f) unless the words "means for" or "step for" are explicitly recited in the claim.

The subject matter recited in the claims is not coextensive with and should not be interpreted to be coextensive with any embodiment, feature, or combination of features described or illustrated in this document. This is true even if only a single embodiment of the feature or combination of features is illustrated and described.

Joining or Fastening Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Quickly releasable joining (i.e., quick-release) refers to joining that that can be released without the use of tools. Readily or easily releasable joining refers to joining that can be readily, easily, and/or promptly released with little or no difficulty or effort. Some joining can qualify as both quickly releasable joining and readily or easily releasable joining. Other joining can qualify as one of these types of joining but not the other. For example, one type of joining may be readily or easily releasable but also require the use of a tool.

Non-quickly releasable joining (i.e., non-quick-release) refers to joining that can only be released with the use of tools. Difficult or hard to release joining refers to joining that is difficult, hard, or arduous to release and/or requires substantial effort to release. Some joining can qualify as both non-quickly releasable joining and difficult or hard to release joining. Other joining can qualify as one of these types of joining but not the other. For example, one type of joining may require the use of a tool but may not be difficult or hard to release.

The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners is given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or confirmat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, or the like can be permanent, readily releasable, or difficult to release depending on the application.

Drawing Related Terminology and Interpretative Conventions

Reference numbers in the drawings and corresponding description refer to identical or similar elements although such numbers may be referenced in the context of different embodiments.

The drawings are intended to illustrate embodiments that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any ranges or subranges that can be formed by such values.

Spatial or directional terms, such as "left," "right," "front," "back," or the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

INCORPORATION BY REFERENCE

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

ADDITIONAL DOCUMENTS INCORPORATED BY REFERENCE

U.S. patent application Ser. No. 17/451,640, titled "Bed Lifts and Related Structures," filed on 20 Oct. 2021.

U.S. Pat. Pub. No. 2013/0081336 (application Ser. No. 13/685,471), titled "Bed Lift," filed on 26 Nov. 2012, published on 4 Apr. 2013.

U.S. Pat. Pub. No. 2015/0329035 (application Ser. No. 14/714,215), titled "Bed Lift Mounting Member," filed on 15 May 2015, published on 19 Nov. 2015.

U.S. Pat. Pub. No. 2018/0027978 (application Ser. No. 15/660,938), titled "Furniture Lifting System," filed on 26 Jul. 2017, published on 1 Feb. 2018.

U.S. Pat. Pub. No. 2019/0217752 (application Ser. No. 16/247,536), titled "Bed Support Mechanism for a Bed Lift," filed on 14 Jan. 2019, published on 18 Jul. 2019.

U.S. Pat. Pub. No. 2022/0242300 (application Ser. No. 17/659,591), titled "Bed Lift Mounting Member," filed on 18 Apr. 2022, published on 4 Aug. 2022.

What is claimed is:

1. A bed lift comprising:

a guide rail structured to be coupled inside a vehicle in a vertical orientation, the guide rail also being structured to be coupled to a bed in the vehicle movable between a lowered position and a raised position and having a near side and a far side, the guide rail being structured to be coupled to the near side of the bed; and at least one flexible support line structured to extend upward from a lower anchor point in the vehicle to one side of the bed, across the bed to an opposite side of the bed, and upward from the opposite side of the bed to an upper anchor point in the vehicle;

wherein the at least one flexible support line is structured to slide across the bed and hold the bed in an at least approximately horizontal orientation as the bed moves between the lowered position and the raised position; and wherein the at least one flexible support line is structured to be the only support for the far side of the bed in the vehicle.

2. The bed lift of claim 1 wherein the guide rail is a first guide rail and wherein the at least one flexible support line comprises at least two flexible support lines, the bed lift comprising:

a second guide rail structured to be coupled inside the vehicle in a vertical orientation, the second guide rail also being structured to be coupled to the near side of the bed in the vehicle;

wherein each of the at least two flexible support lines is structured to extend upward from a respective lower anchor point in the vehicle to the one side of the bed, across the bed to the opposite side of the bed, and upward from the opposite side of the bed to a respective upper anchor point in the vehicle;

wherein the at least two flexible support lines are each structured to slide across the bed and hold the bed in an at least approximately horizontal orientation as the bed moves between the lowered position and the raised position; and wherein the at least two flexible support lines are structured to be the only support for the far side of the bed in the vehicle.

3. The bed lift of claim 1 wherein the one side of the bed is the near side of the bed and the opposite side of the bed is the far side of the bed.

4. The bed lift of claim 1 wherein the upper anchor point is on a ceiling of the vehicle.

5. The bed lift of claim 1 wherein the lower anchor point is on a wall of the vehicle.

6. The bed lift of claim 1 wherein the at least one flexible support line is structured to slide underneath or through the bed.

* * * * *